US012440327B2

(12) United States Patent
Israeli et al.

(10) Patent No.: US 12,440,327 B2
(45) Date of Patent: Oct. 14, 2025

(54) INTRAOCULAR LENS HOLDING DEVICES

(71) Applicant: Eyemed Technologies Ltd, Kiryat Ono (IL)

(72) Inventors: Nir Israeli, Ramat Gan (IL); Vadim Shmukler, Rishon LeZion (IL); Philip Mitsel, Lod (IL)

(73) Assignee: Eyemed Technologies Ltd, Kiryat Ono (IL)

( * ) Notice: Subject to any disclaimer, the term of this patent is extended or adjusted under 35 U.S.C. 154(b) by 0 days.

(21) Appl. No.: 18/720,780

(22) PCT Filed: Jan. 23, 2023

(86) PCT No.: PCT/IL2023/050075
§ 371 (c)(1),
(2) Date: Jun. 17, 2024

(87) PCT Pub. No.: WO2023/139589
PCT Pub. Date: Jul. 27, 2023

(65) Prior Publication Data
US 2024/0415632 A1 Dec. 19, 2024

(30) Foreign Application Priority Data

Jan. 24, 2022 (IL) .......................................... 290086
Apr. 6, 2022 (IL) .......................................... 292028

(51) Int. Cl.
*A61F 2/16* (2006.01)

(52) U.S. Cl.
CPC .... *A61F 2/1624* (2013.01); *A61F 2002/1681* (2013.01); *A61F 2210/0014* (2013.01); *A61F 2250/0006* (2013.01)

(58) Field of Classification Search
None
See application file for complete search history.

(56) References Cited

U.S. PATENT DOCUMENTS

2007/0238174 A1 * 10/2007 Cousins ................. A61L 27/50
435/375
2011/0040378 A1 2/2011 Werblin
(Continued)

OTHER PUBLICATIONS

International Search Report and Written Opinion for International Application No. PCT/IL2023/050075 mailed Feb. 26, 2023.

*Primary Examiner* — Leslie A Lopez
(74) *Attorney, Agent, or Firm* — Ballard Spahr LLP

(57) ABSTRACT

Devices for implanting inside an eye and for holding an intraocular lens (IOL) are presented; the device being operable to rotate the IOL, around an optical axis of the IOL, by absorbing energy from a remote energy source; the device comprises: a stator portion configured to be fixedly positioned inside the lens capsule of the eye; a rotor portion configured to be fixedly attached to the IOL; and a movement system operable to cause rotation of the rotor portion and the IOL, the movement system comprises a plurality of actuators and at least one interaction region associated with the plurality of actuators, the plurality of actuators comprise at least two actuators operable to cause the rotation of the rotor portion and the IOL in each of the clockwise and counterclockwise angular directions, the plurality of actuators and the at least one interaction region being aligned such that at each given moment in time, each actuator of the plurality of actuators is aligned differently with respect to the interaction region associated therewith, and is configured, when being activated by said remote energy source, to engage with the associated interaction region to cause the IOL to rotate with a different incremental rotation having either a different angular distance or a different angular direction; the device may comprise a protective shielding assembly that seals the moving parts from invading biological tissue.

20 Claims, 26 Drawing Sheets

(56) References Cited

U.S. PATENT DOCUMENTS

| | | |
|---|---|---|
| 2016/0184088 A1 | 6/2016 | Wanders |
| 2016/0235587 A1* | 8/2016 | Kahook .................... A61F 2/16 |
| 2019/0269500 A1 | 9/2019 | De Juan et al. |
| 2020/0197157 A1* | 6/2020 | Shmukler ............. A61F 2/1632 |
| 2021/0128293 A1* | 5/2021 | Wortz ....................... A61F 2/14 |

* cited by examiner

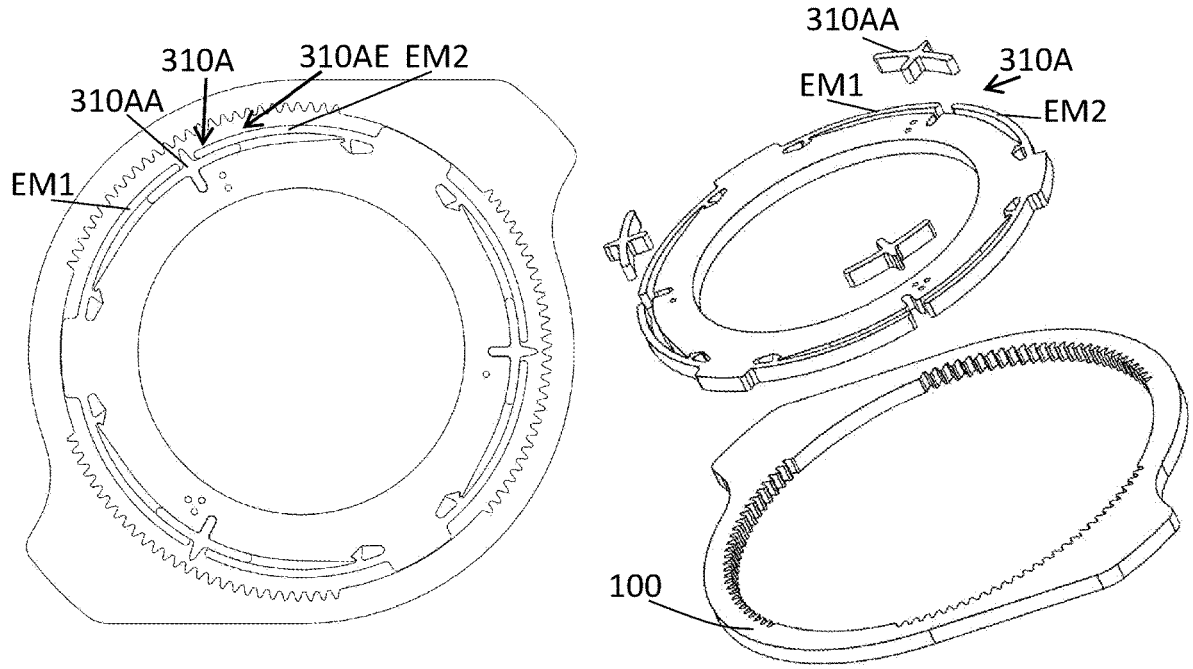
Fig. 1C       Fig. 1D
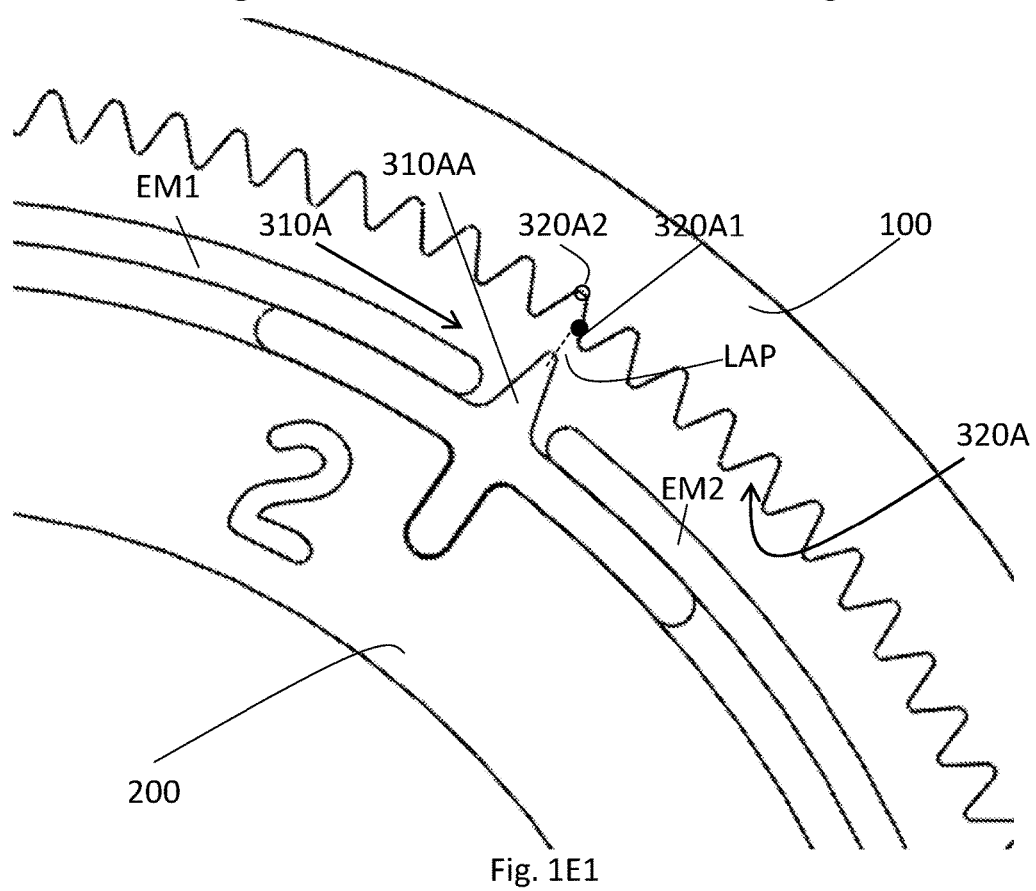
Fig. 1E1

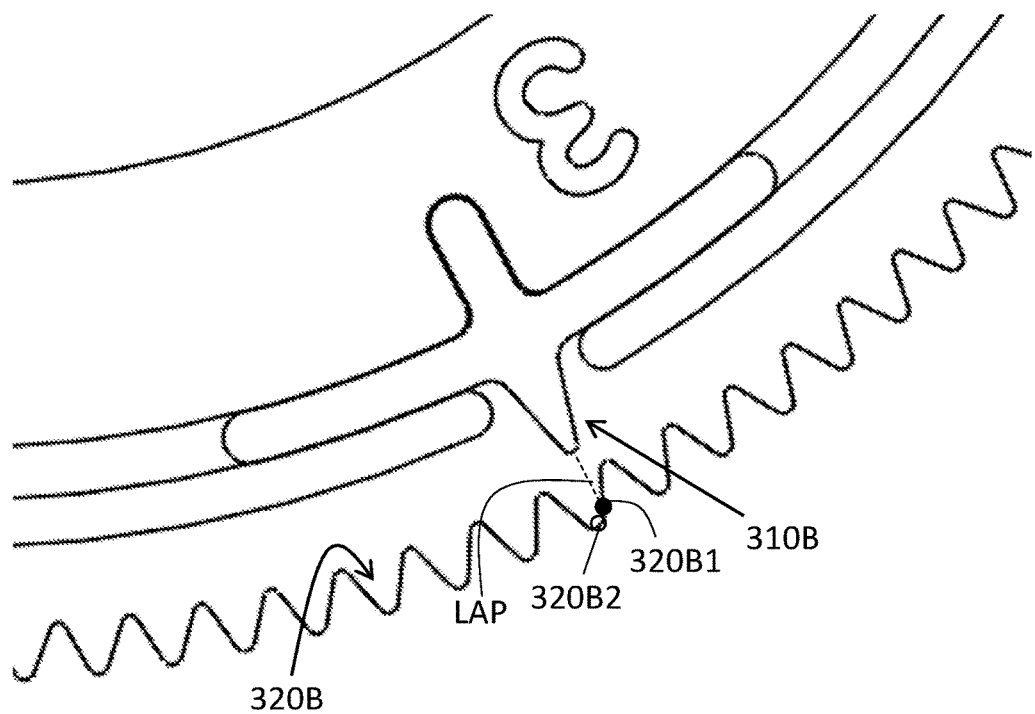
Fig. 1E2
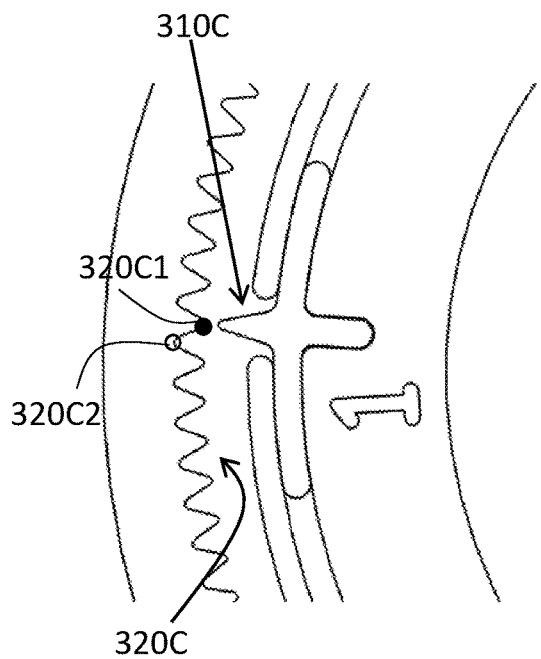
Fig. 1E3
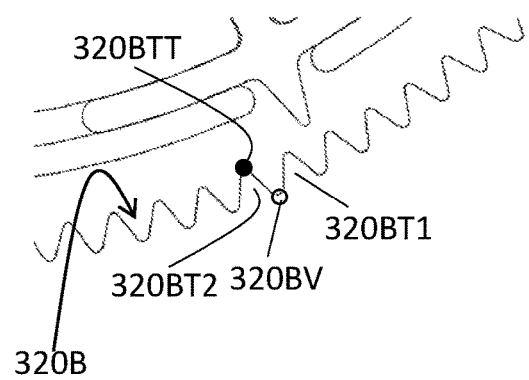
Fig. 1E4

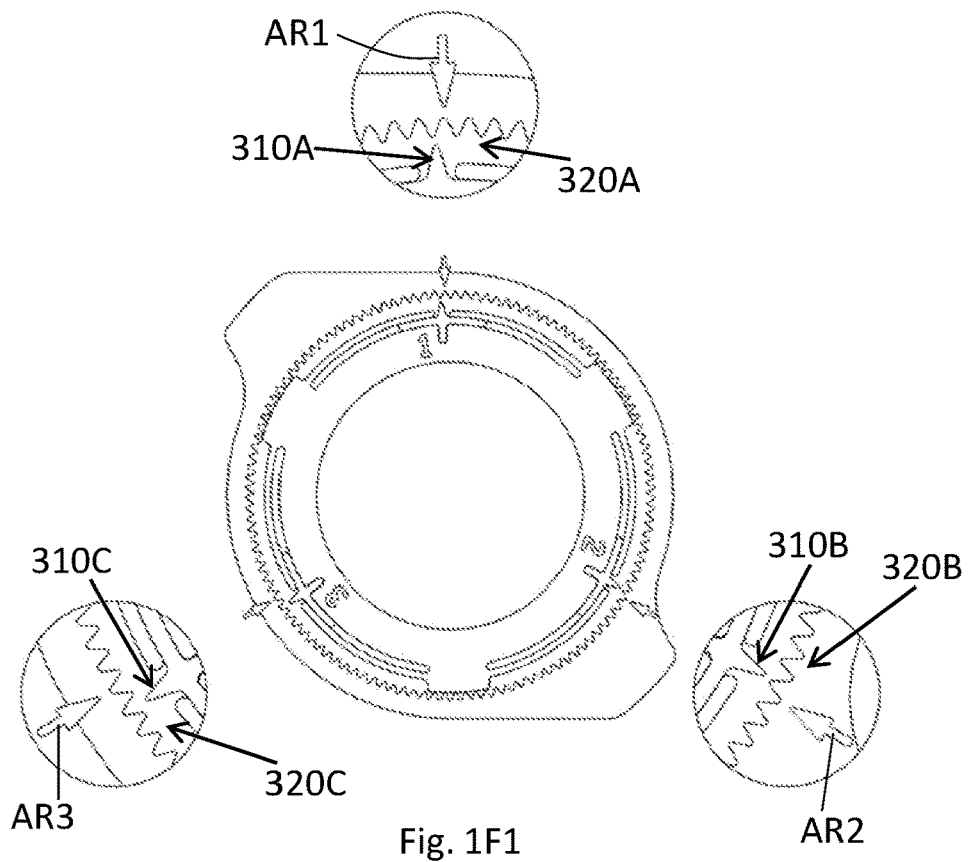
Fig. 1F1
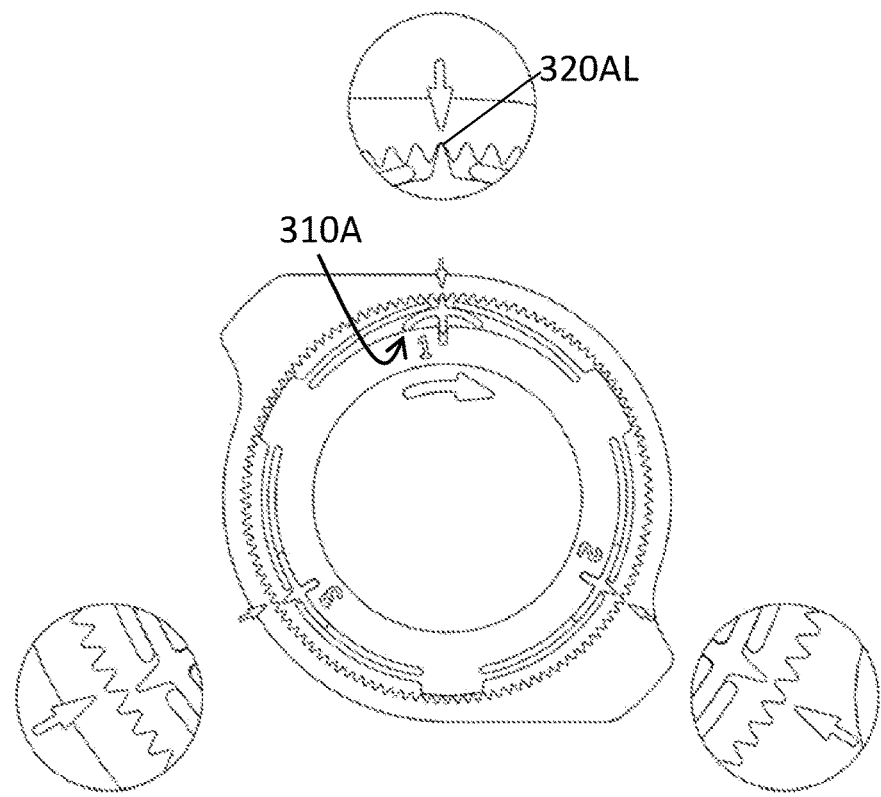
Fig. 1F2

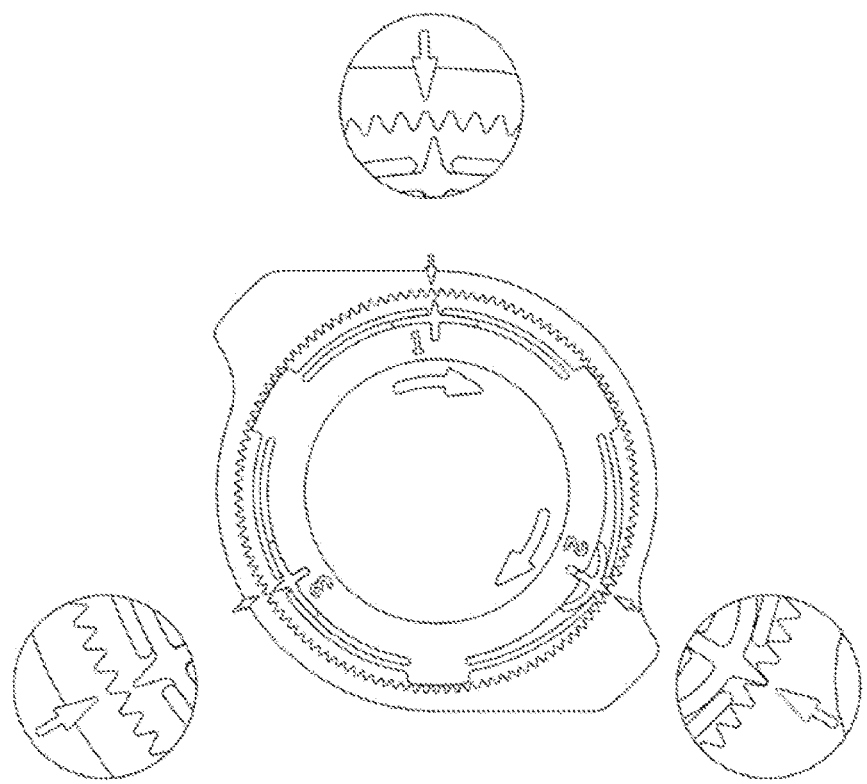
Fig. 1F3
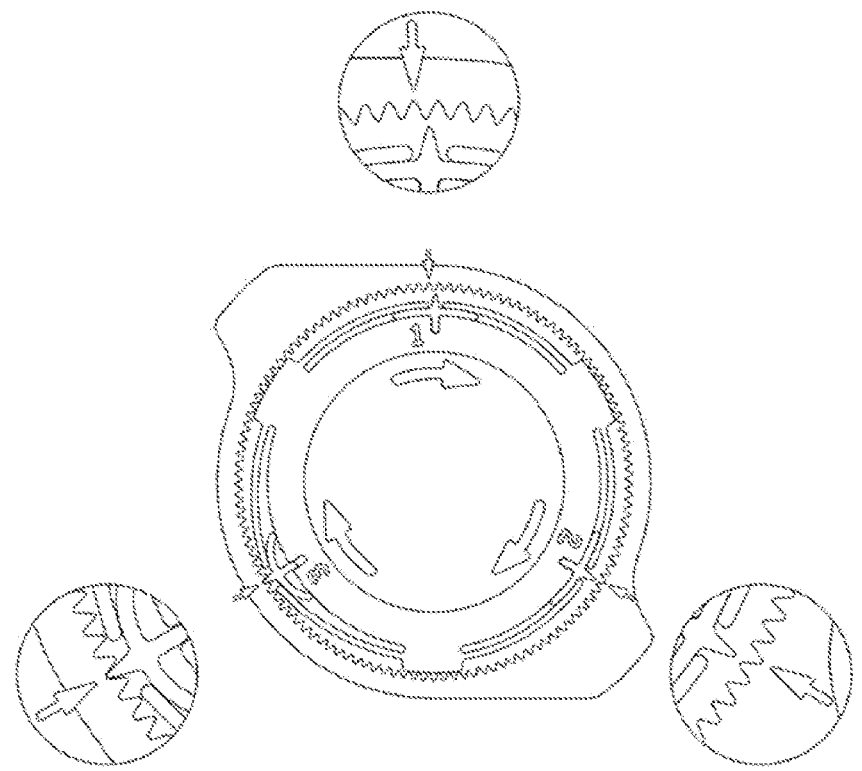
Fig. 1F4

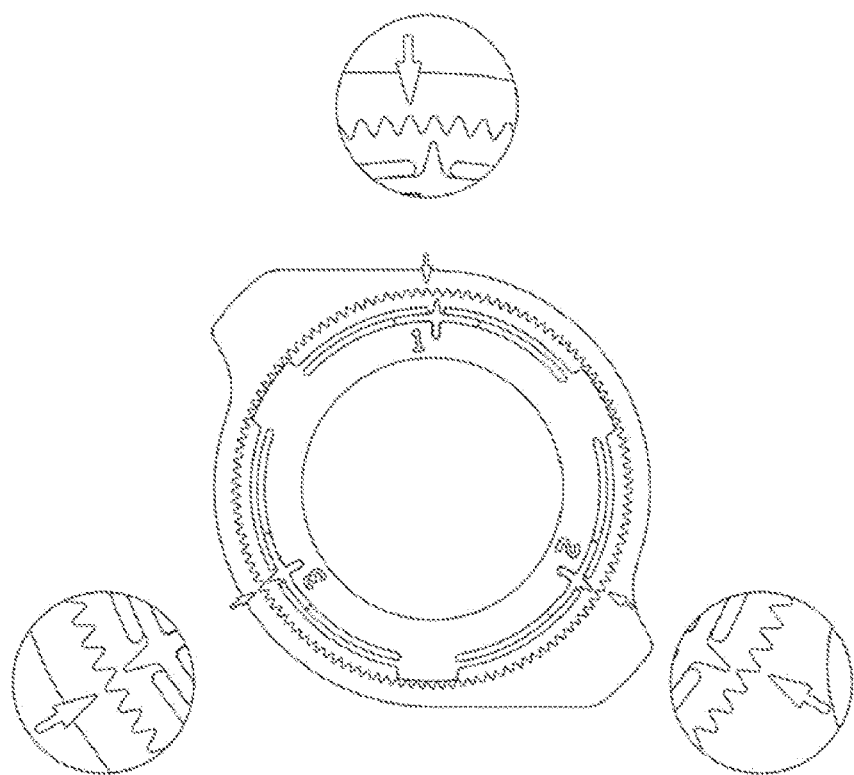
Fig. 1G1
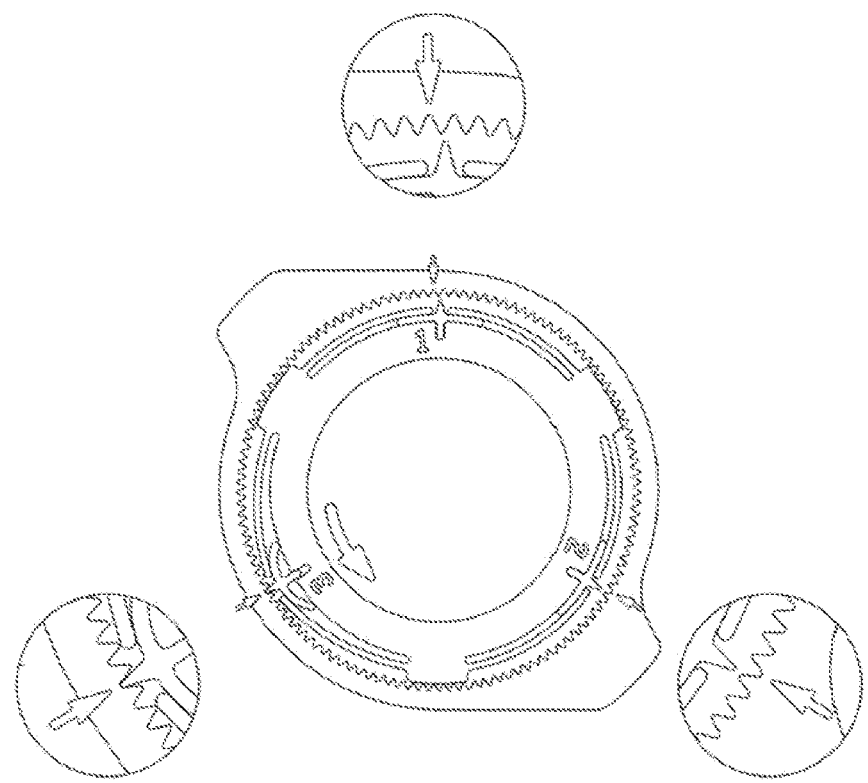
Fig. 1G2

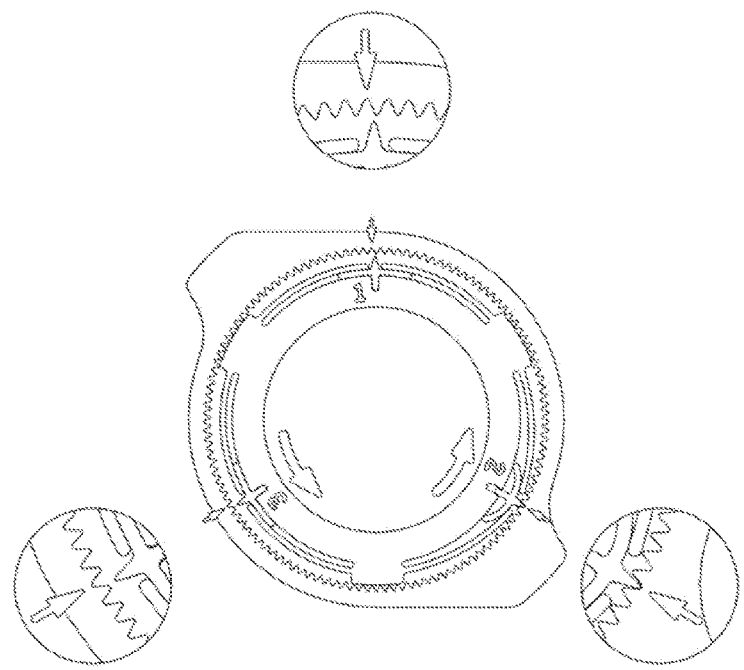
Fig. 1G3
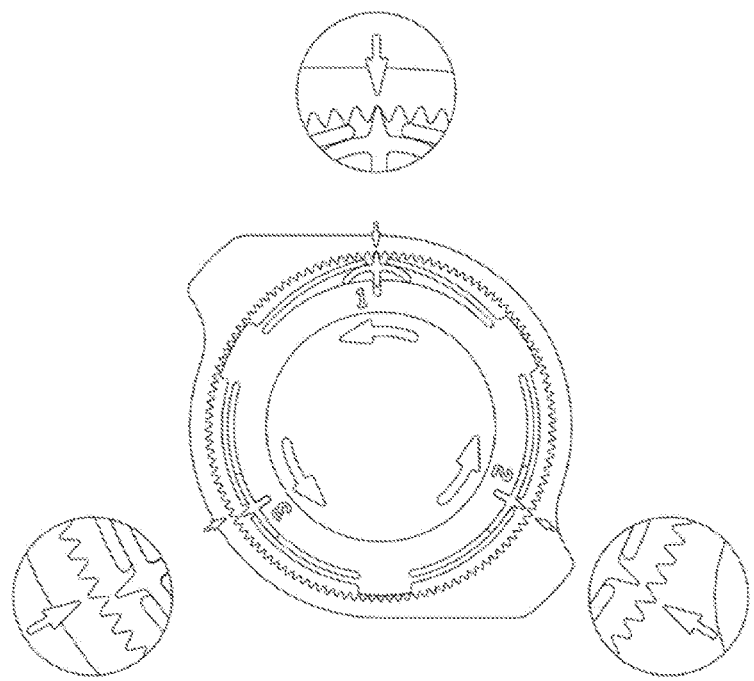
Fig. 1G4

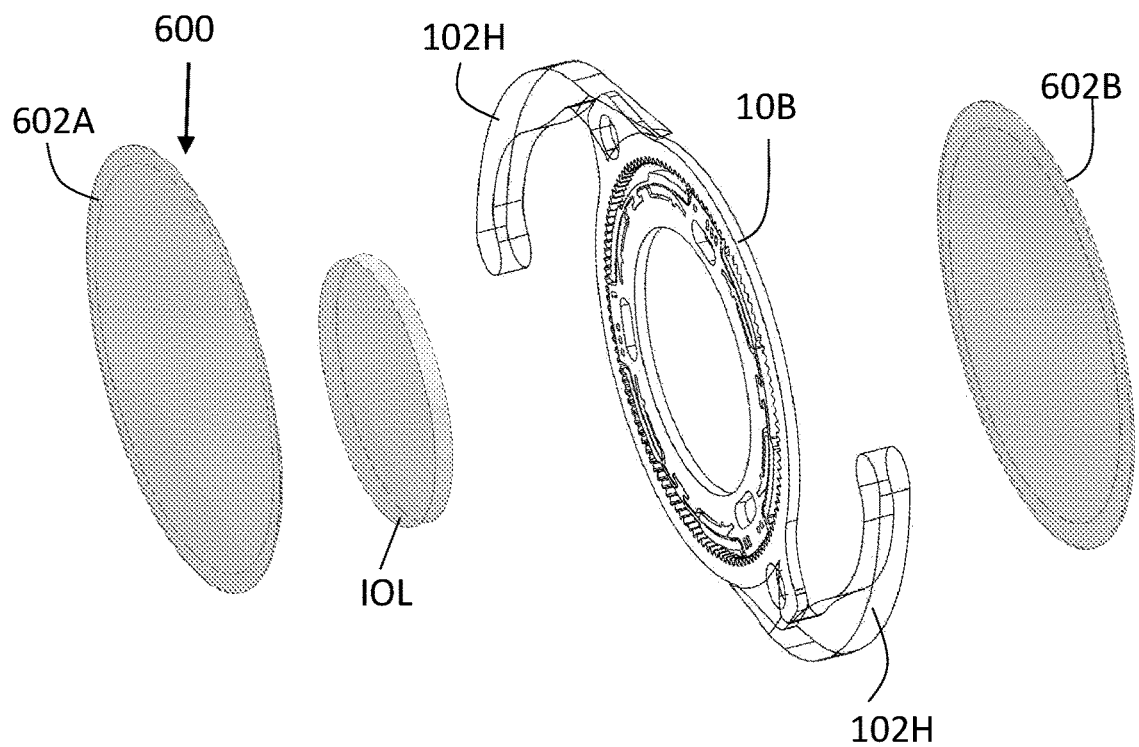
Fig. 8A1
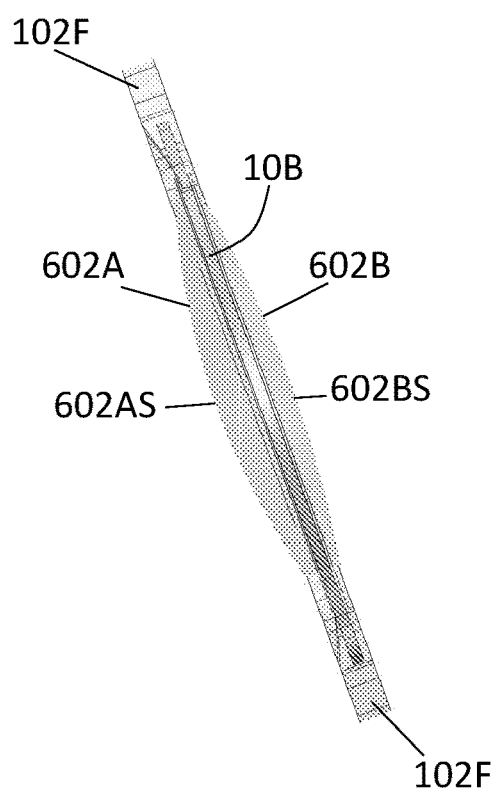
Fig. 8A2

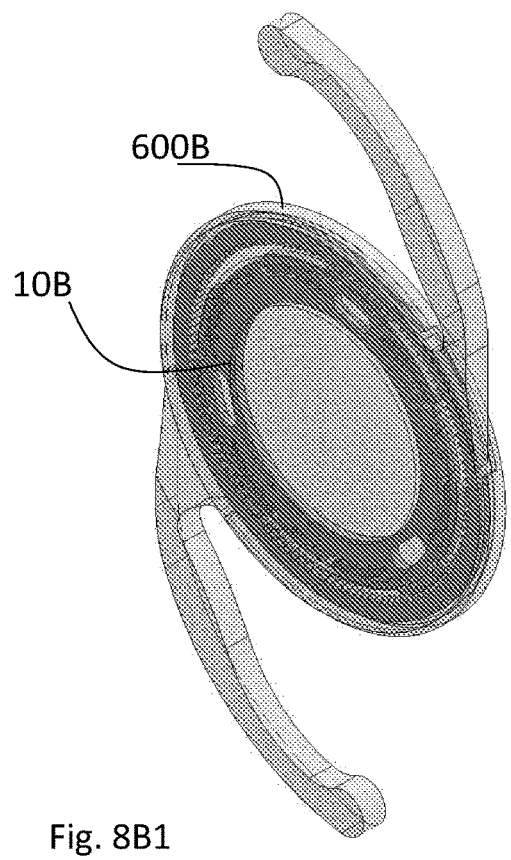
Fig. 8B1
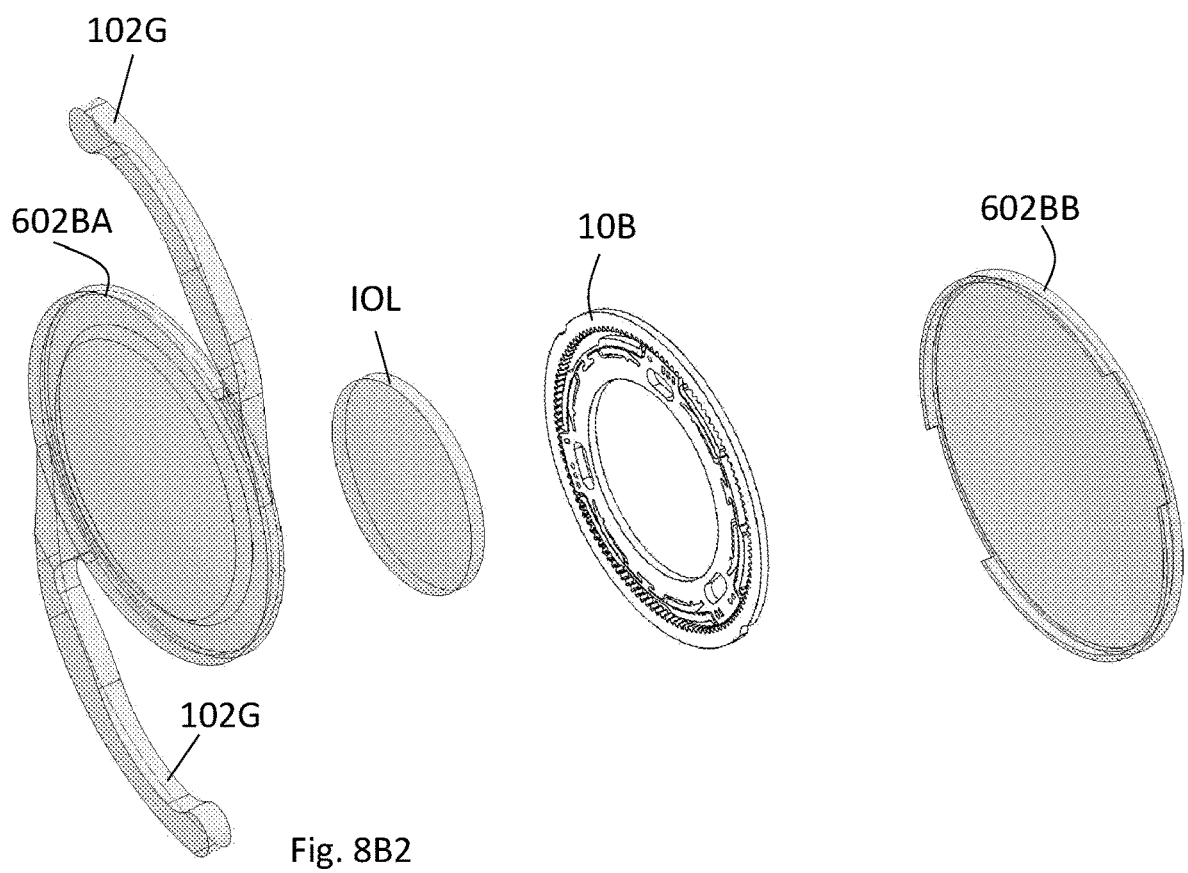
Fig. 8B2

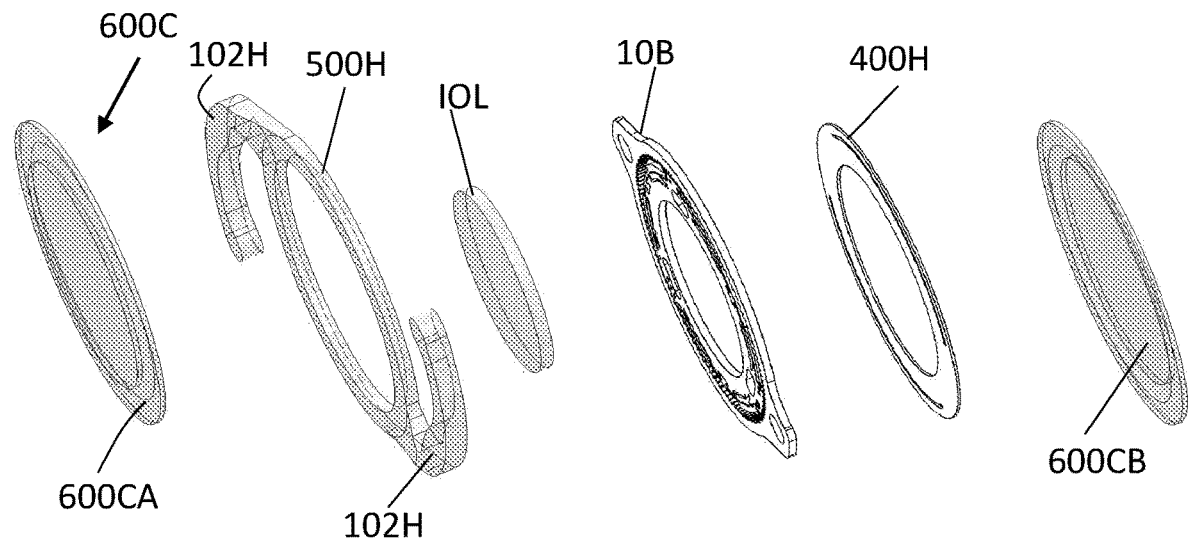
Fig. 8C1
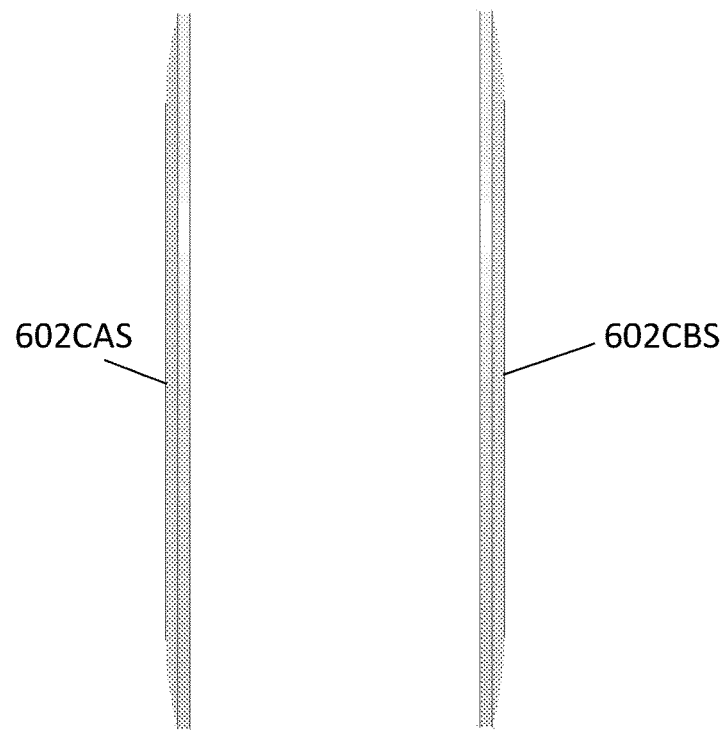
Fig. 8C2

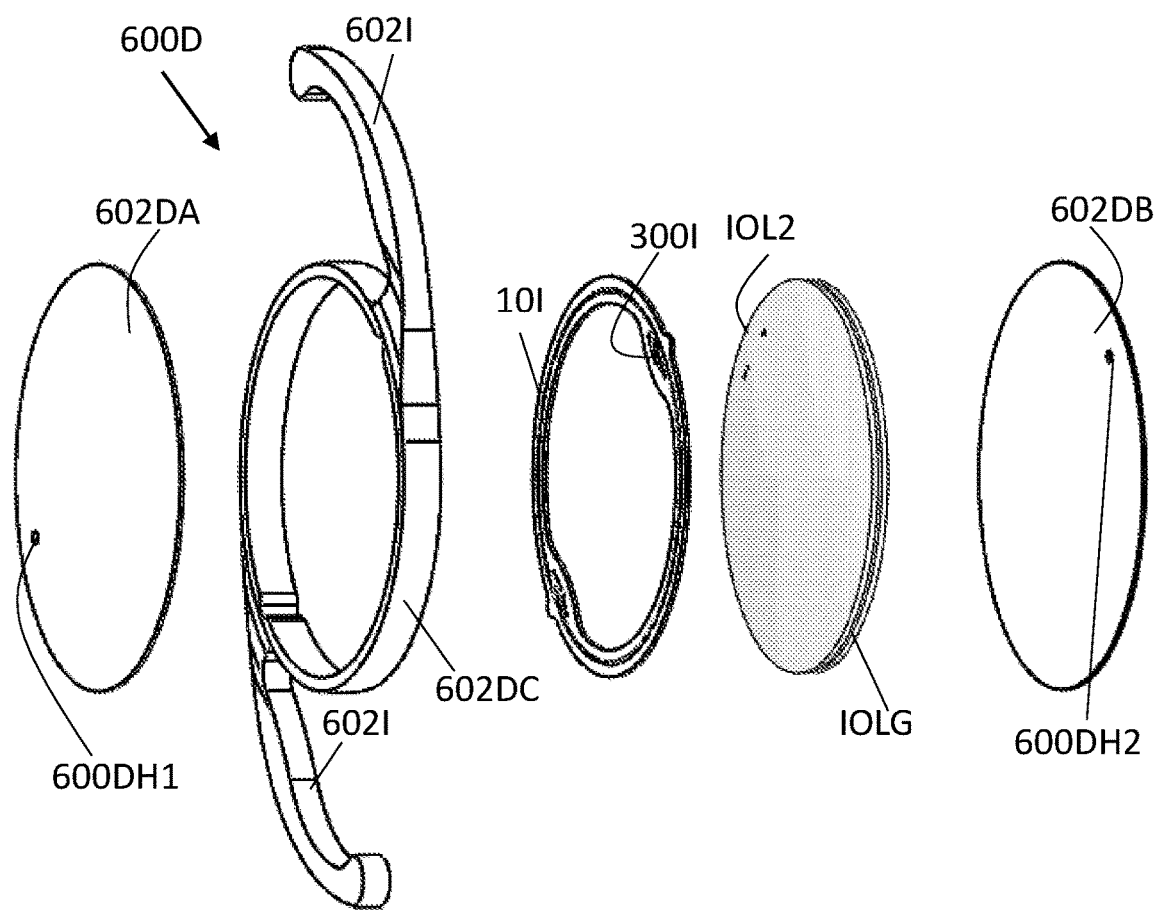
Fig. 8D1
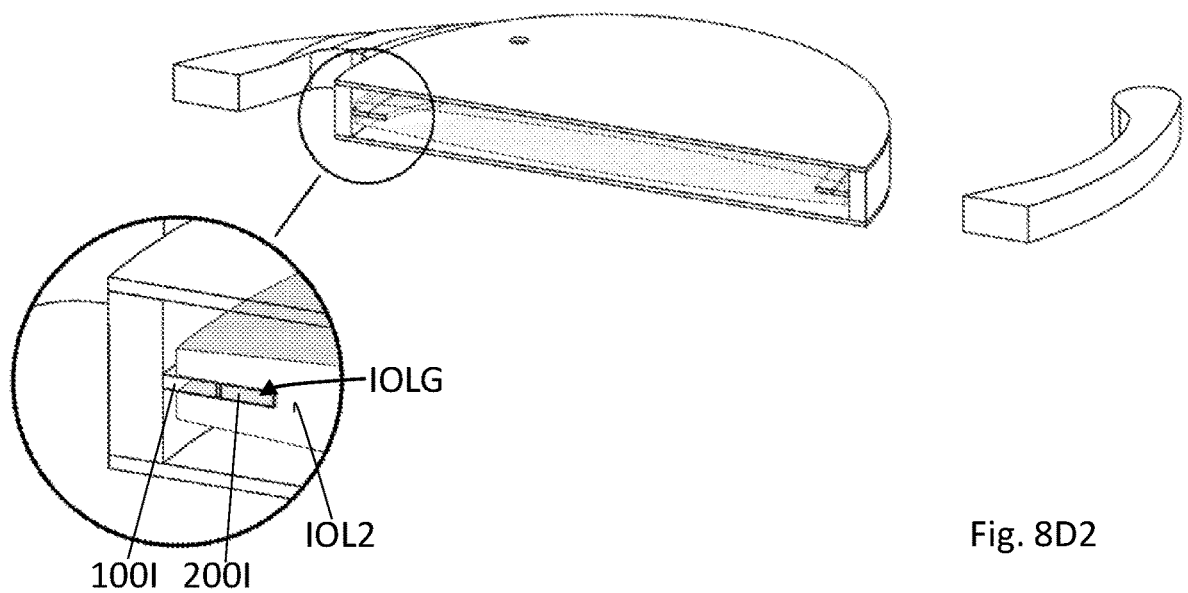
Fig. 8D2

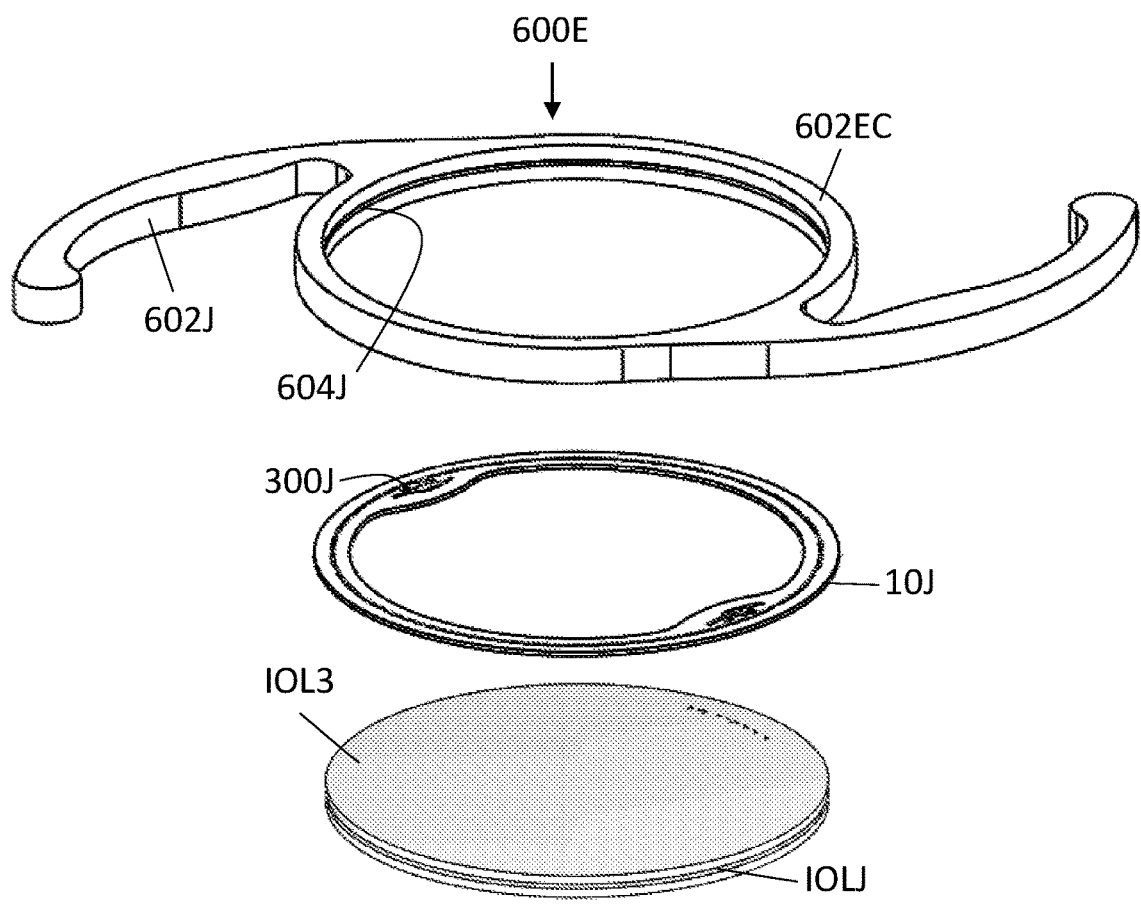
Fig. 8E1
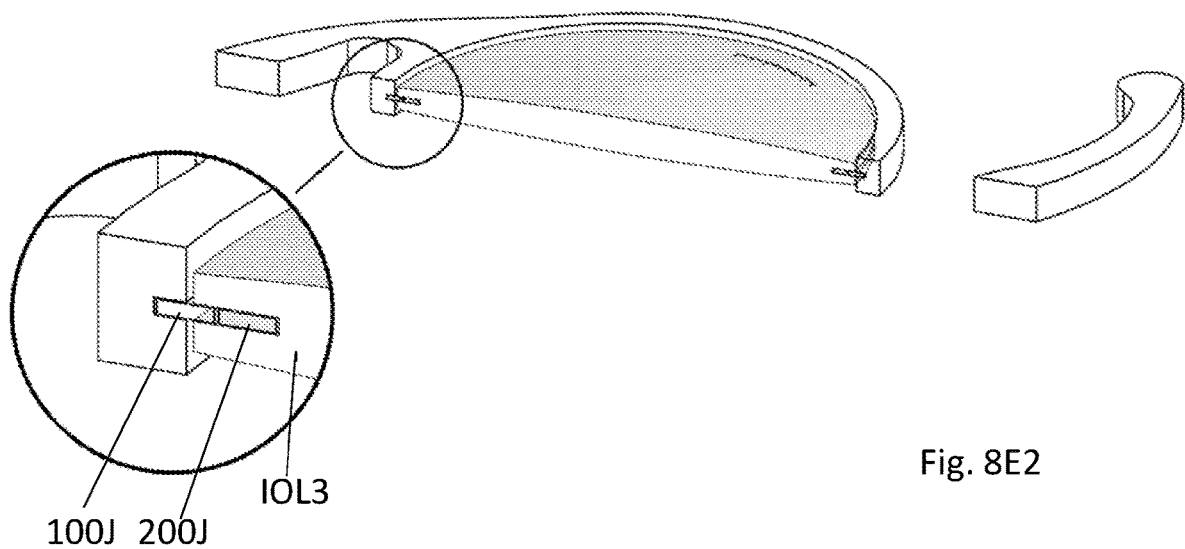
Fig. 8E2

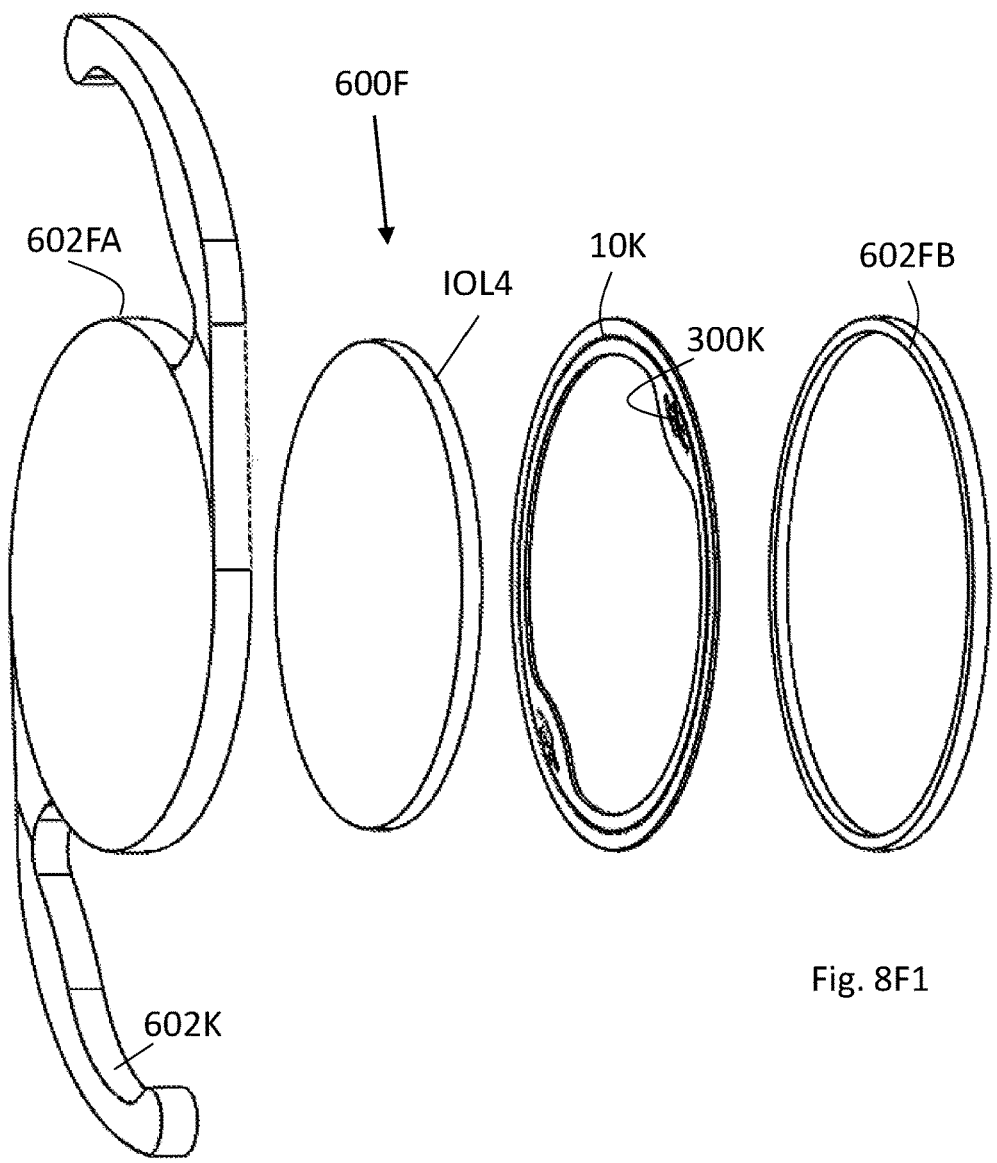
Fig. 8F1
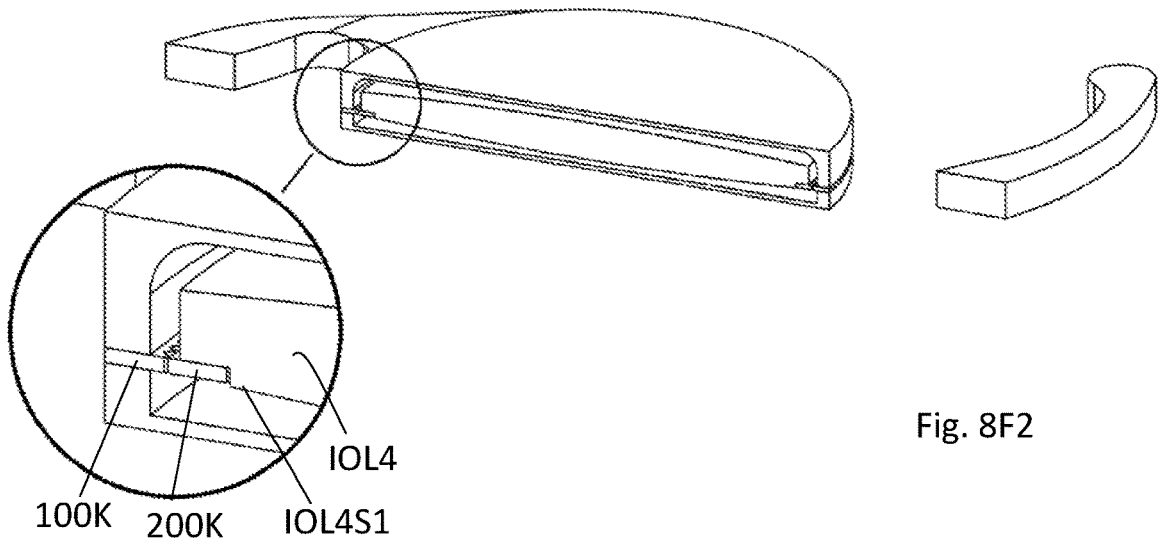
Fig. 8F2

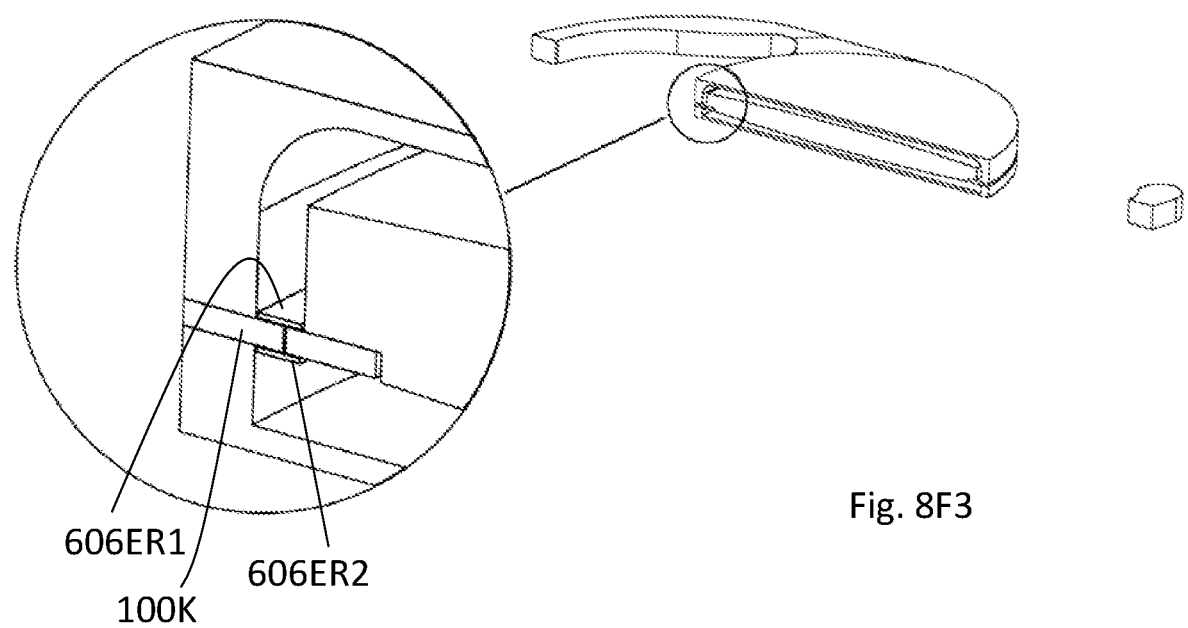
Fig. 8F3

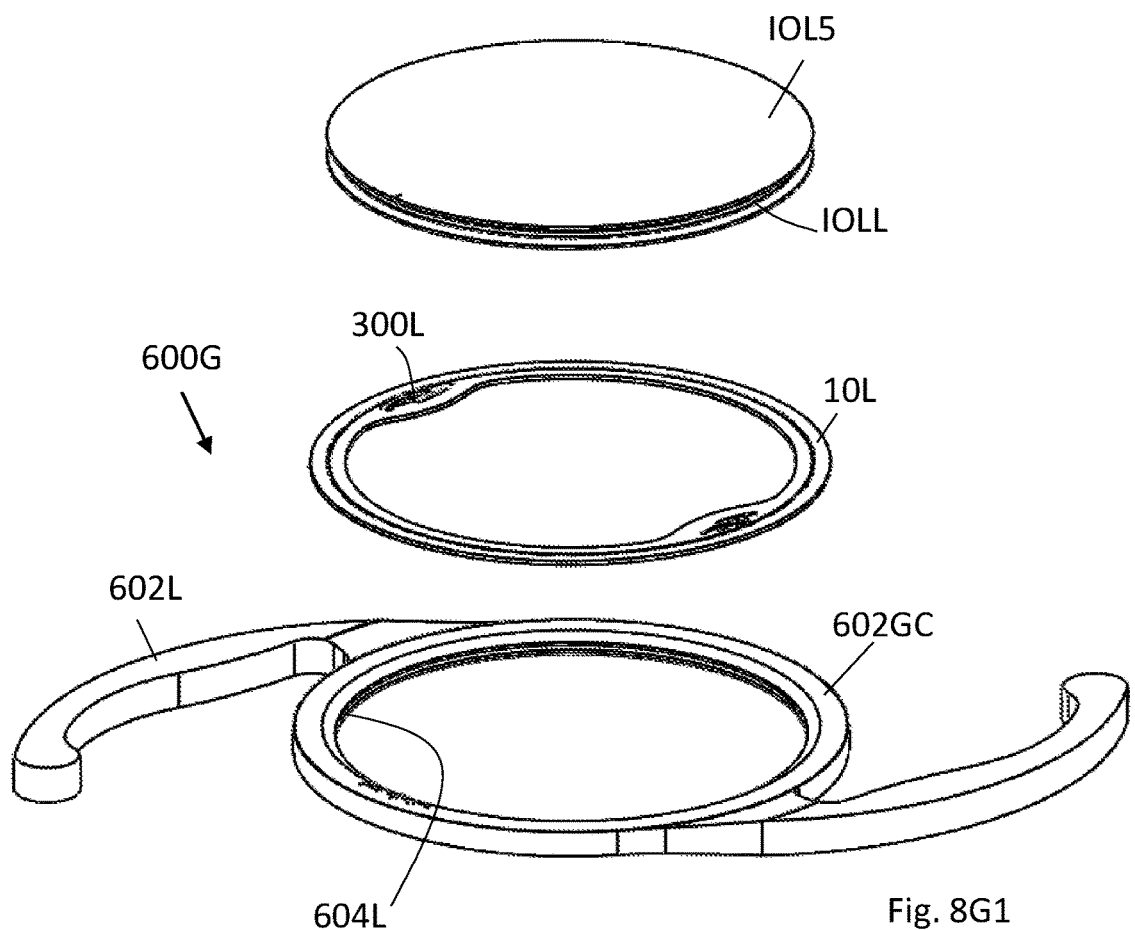
Fig. 8G1
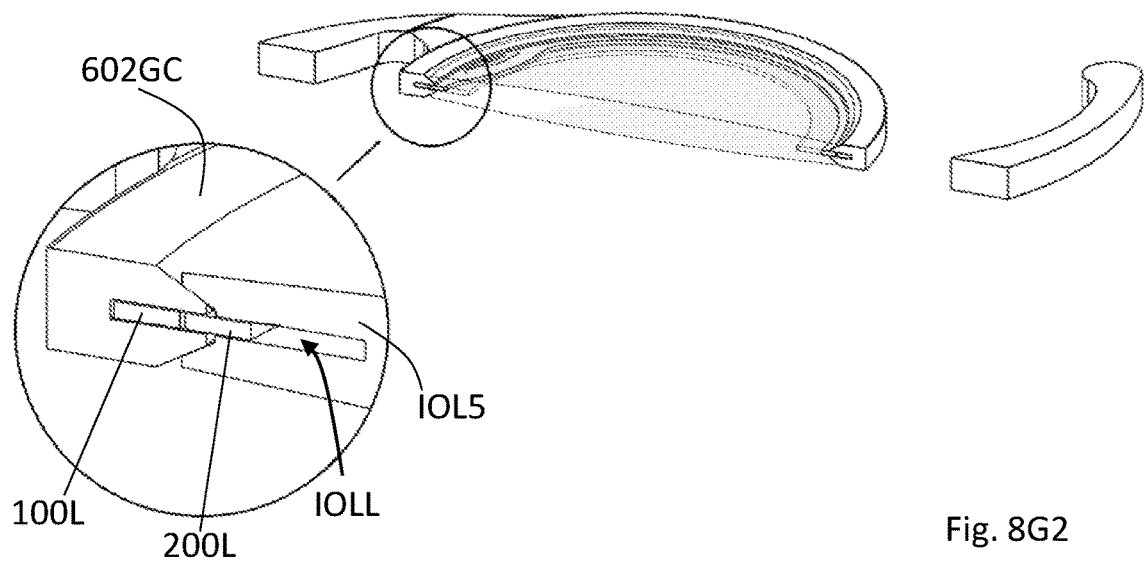
Fig. 8G2

INTRAOCULAR LENS HOLDING DEVICES

TECHNOLOGICAL FIELD

The present invention is in the field of medical devices, and relates specifically to devices configured for holding intraocular lenses in vivo.

BACKGROUND

Various medical conditions related to vision and eyesight are treated by replacement of the natural eye lens with an artificial intraocular lens (IOL). Eye-related problems such as cataract, eye trauma, vision refractive errors including far-sightedness (hyperopia), near-sightedness (myopia) and astigmatism can be solved by IOL replacement surgery. This treatment can be beneficial in other eye conditions in people who are not eligible for laser treatment.

Cataracts are the most prevalent ocular disease worldwide, being the cause of half of blindness and third of visual impairment in the world. About twenty-five million patients worldwide undergo cataract surgery on annual basis.

The typically implanted IOL provides selected focal length and optical power that should allow the patient to have a fairly good vision. However, it is often difficult to predict the exact characteristics of the lens necessary to correct the impaired vision. For example, currently, less than 50% of patients achieve their targeted vision after treatment, even with state-of-the-art multi-focal and other presbyopia correcting intraocular lenses, resulting in that post-surgery patients should often wear glasses for reading or distance vision.

Although it is a frequent surgical procedure, IOL replacement surgery involves several challenges, for example: prediction of exact lens characteristics (ELP); lens-positioning error during the surgery; tilt or shift after the surgery and during eye healing process; and change of the corneal cylinder in the elderly. There are a few types of IOLs used to correct visual impairment, such as Mono-focal, Multi-focal and Toric (with possible combinations in the same lens). Following the installation and healing process, all kinds of IOL may move and deviate from the designed optical axis, hence requiring compensation by optimizing the IOL location inside the lens capsule. Modification of the IOL location may be needed around the optical axis of the IOL, to correct for astigmatism issues, or along the optical axis of the IOL, to correct focusing problems. There are several techniques, both invasive and non-invasive, used to implement the compensations, such as repeated surgery to displace the IOL; use of a unique UV sensitive polymer that enables compensation by post deforming of the lens; and/or modification of the IOL shape by use of laser radiation.

GENERAL DESCRIPTION

The present invention provides techniques for post adjustment and optimization of position of an intraocular lens (IOL) that has been already implanted inside the lens capsule.

The described techniques, systems and devices enable non-invasive, remote, reversible and repeated corrections of the IOL position, enabling the procedure to be performed relatively easily and in short time, in the clinic, while eliminating the need for additional invasive surgical procedures.

The invention provides IOL holding/supporting systems/devices (e.g. in the form of a cradle) that include/integrate a movement system/mechanism/assembly operable to displace and adjust the position of the IOL. The movement system/mechanism/assembly is configured to be activated remotely from outside the eye and apply correction of the IOL position in at least one of the angular (xy plane, theta) and axial (z) directions, i.e. by rotating the IOL and/or changing its optical power respectively. It is noted, that according to the invention, the displacement in the axial direction can be achieved by using a helical path of displacement such that rotation about the optical axis can result in displacement along the optical axis.

The invention enables doctors to precisely adjust the position of the IOL based on the exact amount of visual correction needed to achieve the desired vision. The systems/devices disclosed herein are advantageously miniature enabling remote access to the integrated movement system/mechanism through the pupil of the eye. The diameter of the pupil extends between about 2 mm to 4 mm in light conditions and between about 4 mm to 8 mm in dark conditions. Accordingly, the described systems/devices allow for accommodating an IOL having a diameter in the range of about 3.5-4.5 mm. Consequently, the perimeter in which the movement system/mechanism of the systems/devices should work to displace the IOL is, for example, about π·4 mm (supposing a relatively circular shape having a diameter of 4 mm), and as the accuracy of needed angular correction is about 0.5°-1° this means that the step of angular distance of the corrections is about 0.017-0.035 mm. The technique of the present invention enables achieving step distances in the described range while overcoming the limitations of manufacturing movement systems/mechanisms that enable such tiny step angular/distance corrections.

Additionally, the described systems and devices are elastic and foldable, at least in a working range of temperature, hence facilitating insertion and implantation in the eye capsule.

Thus, according to one aspect, there is provided a device configured to be implanted in a lens capsule of a human eye and securely hold an intraocular lens (IOL) and operable to rotate the IOL, around an optical axis of the IOL, by absorbing energy from a remote energy source, the device comprising:

a stator portion configured to be fixedly positioned inside the lens capsule;
  a rotor portion configured to be fixedly attached to the IOL; and
  a movement system operable to cause incremental rotation of the rotor portion and the IOL, around the optical axis of the IOL, with respect to the stator portion, the movement system comprising a plurality of actuators having a fixed spatial relationship with the rotor portion and at least one interaction region associated with the plurality of actuators and having a fixed spatial relationship with the stator portion, the plurality of actuators comprise at least two actuators operable to cause the rotation of the rotor portion and the IOL in each of the clockwise and counterclockwise angular directions, the plurality of actuators and the at least one interaction region being aligned such that at each given moment in time, each actuator of the plurality of actuators is aligned differently with respect to the interaction region associated therewith and faces a different interaction point on the associated interaction region, and is configured, when being activated by said remote energy source to engage with the associated interaction region at the respective interaction point and to cause the IOL to rotate with a different incremental rotation having either a different angular distance or a different angular direction.

In some embodiments, the plurality of actuators and the associated at least one interaction region are aligned such that at each given time after an actuator of the plurality of actuators is activated by said remote energy source to engage with the associated interaction region at the respective interaction point and cause the IOL to rotate with a specific incremental rotation having specific angular distance and direction, a subsequent actuator of the plurality of actuators becomes aligned with its associated interaction region and configured, when being activated by said remote energy source to engage with its associated interaction region, to cause the IOL to rotate with the same specific incremental rotation having the same specific angular distance and direction.

In some embodiments, the plurality of actuators and the associated at least one interaction region are aligned such that after an actuator is activated to engage with the associated interaction region and cause the IOL to rotate with a specific incremental rotation having specific angular distance and direction, the actuator becomes misaligned with respect to the associated interaction region such that a subsequent activation of the actuator to engage with the associated interaction region results in zero incremental rotation of the IOL.

In some embodiments, the plurality of actuators comprise two actuators spaced-apart with a first distance therebetween, and said associated at least one interaction region comprise two respective interaction regions spaced apart with a second distance therebetween being different than said first distance.

In some embodiments, the plurality of actuators comprise at least three actuators spaced-apart with a variable distance therebetween, and said associated at least one interaction region comprise at least three respective interaction regions spaced apart with a constant distance therebetween.

In some embodiments, the plurality of actuators comprise at least three actuators spaced-apart with a constant distance therebetween, and said associated at least one interaction region comprise at least three respective interaction regions spaced apart with a variable distance therebetween.

In some embodiments, the variable distance is characterized by a fixed increasing pitch between each two adjacent actuators of the at least three actuators or each two adjacent interaction regions of the at least three respective interaction regions.

In some embodiments, at least some actuators of said plurality of actuators when being sequentially activated in a specific activation order, to sequentially engage with the associated interaction region, they cause the IOL to rotate in sequential incremental rotations having equal angular distances and same angular direction.

In some embodiments, at least some actuators of said plurality of actuators are unidirectional such that when being individually activated, to engage with the associated at least one interaction region, they cause the IOL to rotate in same angular direction. The unidirectional actuators may comprise a first group of unidirectional actuators operable to cause the IOL to rotate in clockwise direction, when being sequentially activated to engage with the associated interaction region, and a second group of unidirectional actuators operable to cause the IOL to rotate in counterclockwise direction, when being sequentially activated to engage with the associated at least one interaction region.

In some embodiments, at least some actuators of said plurality of actuators are bidirectional such that when being individually activated to engage with the associated at least one interaction region, they cause the IOL to rotate either in clockwise or counterclockwise angular direction based on their temporary alignment with respect to the associated interaction region.

In some embodiments, at least some actuators of the plurality of actuators each having a length dimension defining the actuator as being unidirectional actuator or bidirectional actuator configured, when being activated by said remote energy source, to cause the IOL to rotate in respectively one or two angular directions.

In some embodiments, each actuator of said plurality of actuators comprises an actuator activable portion being reversibly shiftable between a first resting spatial configuration, and a second activated spatial configuration when being activated by said remote energy source, thereby respectively enabling the actuator to engage with and disengage from the associated interaction region. Each actuator of said plurality of actuators may comprise an actuator elastic portion in communication with said actuator activable portion, the actuator elastic portion being operable to return the actuator activable portion from said second activated spatial configuration into said first resting spatial configuration once the actuator activable portion is no more activated by said remote energy source. The actuator elastic portion may be operable to engage with the associated interaction region, when said actuator activable portion is activated by said remote energy source, to cause the IOL to rotate with the incremental rotation.

In some embodiments, the actuator activable portion comprises a shape-memory material operable to provide said first resting spatial configuration and second activated spatial configuration. The shape-memory material may comprise nitinol or/and a bi-metal.

In some embodiments, the stator portion comprises super-elastic material.

In some embodiments, the rotor portion comprises super-elastic material.

In some embodiments, the super-elastic material comprises nitinol or/and a bi-metal.

In some embodiments, the device is foldable such that it can be passed through a cross-section of about 2.54 mm$^2$ area or about 1.8 mm circular diameter.

In some embodiments, the incremental rotation has an angular distance being equivalent to or greater than an angle of 0.3°.

In some embodiments, one or more of said at least one interaction region is(are) defined by a series of teeth protrusions. Each tooth protrusion may define an incremental rotation of angular distance being equivalent to or greater than an angle of 0.6°.

In some embodiments, the device comprises one or more marks enabling to identify each actuator of the plurality of actuators to thereby enable which actuator is to be activated.

In some embodiments, the device further comprises a protective shielding assembly configured to shield the movement system and/or the rotor portion, at least partially, so as to prevent interaction of biological tissue with the movement system and/or the rotor portion in a way that blocks the incremental rotation of the IOL.

In some embodiments, the protective shielding assembly comprises an anterior cover and a posterior cover configured to shield the movement system and/or the rotor portion from anterior and posterior sides of the device respectively.

In some embodiments, the anterior and posterior covers respectively shield the whole anterior and posterior sides of the device.

In some embodiments, the anterior and posterior covers are configured to be attached, directly or indirectly, to the stator portion of the device.

In some embodiments, the anterior and posterior covers are configured to be attached to the stator portion of the device by gluing and/or welding.

In some embodiments, the anterior and posterior covers are attachable to each other such that they form an enclosure that envelopes the stator portion of the device.

In some embodiments, the protective shielding assembly is configured to enable light entering the eye to pass through the IOL and reach the retina.

In some embodiments, the protective shielding assembly is configured to enable said energy from the remote energy source to reach the actuators.

In some embodiments, the protective shielding assembly is at least partially made from polymethyl methacrylate (PMMA), either hydrophobic or hydrophilic.

In some embodiments, the protective shielding assembly comprises one or more channels that enable flow of aqueous humour between inside and outside of the protective shielding assembly while preventing said interaction of the some kinds of the biological tissue with the movement system and/or the rotor portion.

In some embodiments, the protective shielding assembly comprises a side portion configured to attach to an outer side of the stator portion.

In some embodiments, the side portion comprises a circumferential groove configured to fixedly accommodate at least an outer portion of the stator portion.

In some embodiments, the groove is configured to accommodate all of the stator portion therein and, in addition, the movement system and at least an outer side of the rotor portion.

According to another aspect, there is provided an IOL system comprising:
the device described above;
an IOL, the IOL being grooved along its circumference and configured to accommodate at least an inner portion of the rotor portion therein.

In some embodiments, an inner side of said side portion is configured to engage with an outer circumferential side of said IOL in a male-female configuration respectively, thereby shielding the movement system and the rotor portion accommodated within the grooves while enabling the rotational movement of the IOL.

According to another aspect, there is provided an IOL adjustment system comprising:
a device having any one of the configurations described above; and
a remote energy source configured and operable to provide said energy to said plurality of actuators.

In some embodiments, the remote energy source is configured and operable to provide said energy in the form of heat. The remote energy source may comprise one or more of the following: a radiating element, a laser source.

In some embodiments, the laser source is configured and operable to provide continuous laser radiation. In some embodiments, the laser source is configured as an Argon laser source operable to provide light of a green spectrum. In some embodiments, the laser source comprises one or more laser diodes, e.g. adaptive laser diodes. In some embodiments, the laser source is configured and operable to provide laser power between 0.1-5 watt, and laser pulse width between 200-1000 ms.

According to another aspect, there is provided a protective shielding assembly for use with an intraocular lens (IOL) holding device configured to be implanted inside the eye and hold the IOL, the IOL holding device comprising moving parts configured to enable displacement of the IOL by absorbing energy from a remote energy source, the protective shielding assembly being configured to shield the moving parts at least partially so as to prevent interaction of biological tissue with the moving parts in a way that blocks the displacement of the IOL.

In some embodiments, the protective shield assembly comprises an anterior cover and a posterior cover configured to shield the moving parts from anterior and posterior sides of the IOL holding device respectively.

In some embodiments, the anterior and posterior covers respectively shield the whole anterior and posterior sides of the device, wherein said anterior and posterior covers are configured to be attached, directly or indirectly, to a stator portion of the IOL holding device by gluing and/or welding.

In some embodiments, the anterior and posterior covers are attachable to each other such that they form an enclosure that envelopes the stator portion of the device.

In some embodiments, the protective shielding assembly is configured to enable light entering the eye to pass through the IOL and reach the retina and to enable said energy from the remote energy source to reach and activate the moving parts.

In some embodiments, the protective shielding assembly is at least partially made from hydrophilic or hydrophobic polymethyl methacrylate (PMMA).

In some embodiments, the protective shielding assembly comprises one or more channels that enable flow of aqueous humour between inside and outside of the protective shielding assembly while preventing said interaction of the some kinds of the biological tissue with the movement system and/or the rotor portion.

In some embodiments, the protective shielding assembly comprises a side portion configured to attach to an outer side of the stator portion.

In some embodiments, the side portion comprises a circumferential groove configured to fixedly accommodate at least an outer portion of the stator portion.

In some embodiments, the groove is configured to accommodate all of the stator portion therein and, in addition, the movement system and at least an outer side of the rotor portion.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A-1G4 illustrate a first non-limiting example of a device configured to hold an IOL and operable to remotely adjust position of the IOL after it has been implanted inside an eye, in accordance with the invention;

FIGS. 8A1-8G2 illustrate non-limiting examples of protective shielding devices/assemblies configured to shield the movement system and/or the rotor portion, at least partially, so as to prevent interaction of biological tissue with the movement system and/or the rotor portion in a way that blocks the incremental rotation of the IOL.

DETAILED DESCRIPTION OF EMBODIMENTS

The present invention is aimed at providing intraocular lens (IOL) holding devices that enable remote, non-invasive, and controlled post-adjustment of the position of the implanted lens.

Figure 1A:
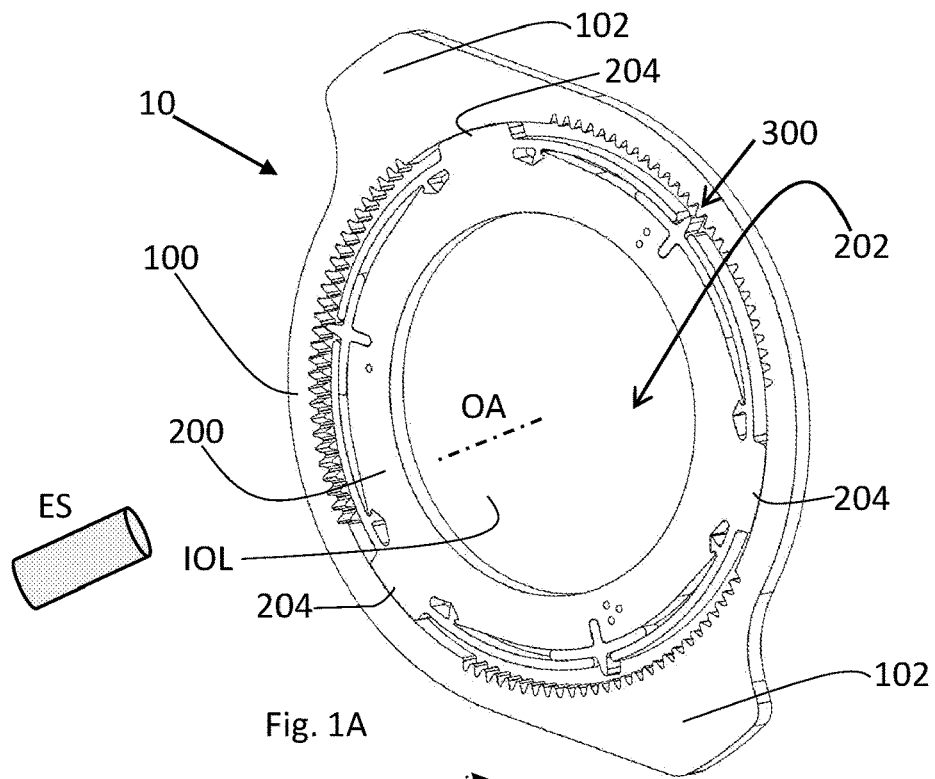

Reference is made to FIGS. 1A-1G4, schematically illustrating a first non-limiting example of a device 10, incorporating the principles of the technique of the present invention, the device 10 being configured to be implanted in a lens capsule of a human eye, securely hold an intraocular lens IOL and operable to rotate the IOL.

Figure 1B:
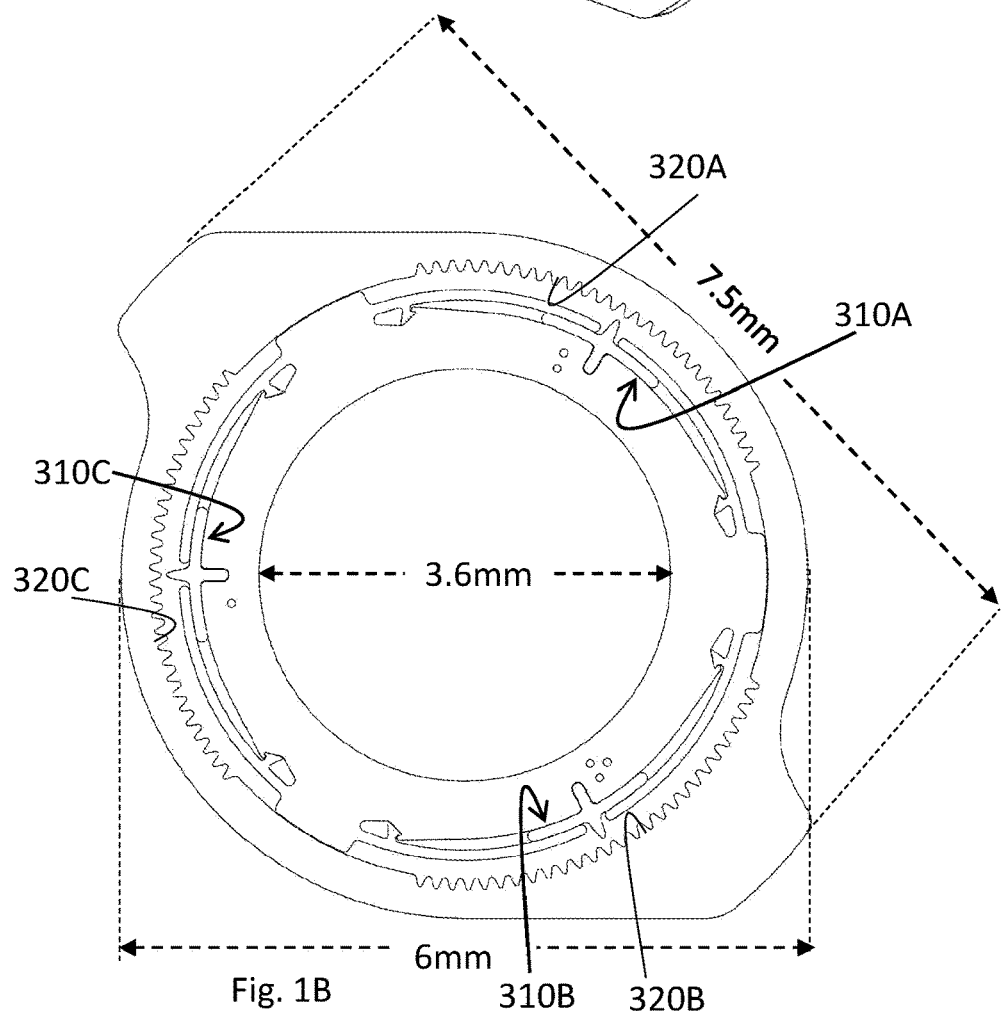

FIG. 1A is an isometric view of the device 10 together with the IOL held thereby; FIG. 1B is a front-view of the device 10; FIG. 1C is a back-view of the device 10; FIG. 1D is an exploded view of the device 10; FIGS. 1E1-1E4 are close-up views of different portions of the device 10; FIGS. 1F1-1F4 illustrate clockwise rotation of the IOL by the device 10; and FIGS. 1G1-1G4 illustrate counterclockwise rotation of the IOL by the device 10.

As shown, the device 10 includes a cavity 202 configured to receive the IOL, and is operable to rotate the IOL, around an optical axis OA of the IOL, by absorbing energy from a remote energy source ES (which is not part of the device 100 and can be selected from a variety of suitable energy sources, such as some laser sources, as will be further described below).

The device 10 includes an outer stator portion 100, an inner rotor portion 200, and a movement system 300 operable, by the remote energy source ES, to rotate the inner rotor portion 200 that is fixedly attached to the IOL with respect to the outer stator portion 100 that is fixedly positioned inside the lens capsule of the eye.

In the present example, and the following examples, the device 10 substantially traces a circular shape, the stator portion substantially forms an outer ring and the rotor portion substantially forms an inner ring, touching each other only at a plurality of regions 204, namely three regions, that are configured here as protrusions on the outer side of the rotor portion. It is noted, however, that the stator and the rotor, each or both, can take other shapes, and they can have, inter alia, open shapes and not necessarily closed shapes as in the present example. For example, the stator and/or the rotor portion may be configured as open arcs.

The device of the invention, holding the IOL, is typically implanted in the anatomical lens capsule compartment, or in the anatomical sulcus in case the lens capsule is damaged/ruptured. Usually, the implantation of the IOL in the human eye is supported by one or more haptics that are attached to the IOL and that can anchor the IOL to the implantation site. In the present example, the stator portion 100 includes two attachment portions 102 at the outer side thereof configured for attaching thereto two corresponding haptics (not shown). The haptics may be adjusted to the specific implantation anatomical site. In some embodiments, the haptics may also form integral parts of the stator portion 100, although in general, as in this example as well, the haptics can be configured as elements that are removably attachable to the stator portion.

The dimensions of the devices of the present invention are selected to enable secure holding of lenses, including off-the-shelf lenses, and to insure secure implantation and effective displacement of the IOL after the implantation. The devices are configured to hold the IOL in a permanent position until the device is activated to displace the IOL. As shown in FIG. 1B in the described example, the dimensions of the device 10 are a diameter of 3.6 mm for the cavity 202 that accommodates the IOL, 6 mm nominal outer diameter of the stator portion and 7.5 mm diameter of the stator portion including the portions 102. It is noted that generally the dimensions of the cavity 202 are between 3.5 mm to 5 mm meeting the dimensions of the IOLs on the market.

The movement system is operable to cause incremental rotation of the rotor portion and the IOL, around the optical axis of the IOL, with respect to the stator portion. Unless the movement system is activated, the IOL is safely and stably located within the lens capsule. In general, the movement system includes a plurality of actuators having a fixed spatial relationship with the rotor portion and at least one interaction region associated with the plurality of actuators and having a fixed spatial relationship with the stator portion.

In some examples, the actuators are separate elements that are fixedly attached to the rotor portion. In some examples, the actuators are integral with the rotor portion. In some examples, the actuators are partially separate and partially integral with the rotor portion. In the described example, the movement system 300 includes three actuators 310A, 310B and 310C that are partially separate and partially integral, fixedly held at the outer side of the rotor portion 200. More details about the actuators 310A-310C will be described further below.

In some examples, the interaction region(s) is(are) separate elements that are fixedly attached to the stator portion. In some examples, the interaction region(s) is(are) integral with the stator portion. In some examples, the interaction region(s) is(are) partially separate and partially integral with the rotor portion. In the described example, the movement system 300 includes three interaction regions 320A, 320B and 320C that are integral with the stator portion and located at the inner side of the stator portion 100. More details about the reaction regions 320A-320C will be described further below.

According to the invention, the plurality of actuators and the plurality of interaction regions associated therewith are aligned such that at each given time each actuator of the plurality of actuators is aligned differently with respect to the associated interaction region, e.g. each actuator faces a different point on the associated interaction region and is configured, when being activated by the remote energy source to engage with the associated interaction region, to cause the IOL to rotate with a different incremental rotation having either a different angular distance or angular direction.

According to the technique of the invention, the plurality of actuators include at least two actuators. As with the associated interaction region(s), it can be that a single interaction region extends from the first to the last actuator and is associated with all, or in another case the associated plurality of interaction regions are at least two. In the case of two actuators and two interaction regions, and supposing a circular arrangement, the two actuators have to be spaced-apart with a first distance therebetween, and the two interaction regions have to be spaced apart with a second distance therebetween being different than the first distance between the actuators, such that the alignment between the first couple of actuator-interaction region is different than the alignment between the second couple of actuator-interaction region. Alternatively, a single interaction region may have a varying pattern of features such that the first actuator is aligned with a first feature and the second actuator is aligned with a second feature.

In another example, the plurality of actuators include at least three actuators spaced-apart with a variable distance therebetween, and the associated plurality of interaction regions include at least three interaction regions spaced apart with a constant distance therebetween, or a single interaction is associated with the three actuators, or two interaction regions among which a first interaction region is associated with two actuators and a second interaction region is associated with the third actuator.

Yet in another example, the plurality of actuators include at least three actuators spaced-apart with a constant distance therebetween, and the associated plurality of interaction regions include at least three interaction regions spaced apart with a variable distance therebetween. Also here, an interaction action region with a variable pattern of features can be utilized such that the actuators are aligned differently with respect to the interaction region.

Alternatively, in some examples both groups of the actuators and interactions regions have a variable distance between the adjacent actuators/interaction regions. The main point is that each actuator—interaction region couple is aligned differently with respect to each other.

In some examples, the variable distance is characterized by a fixed increasing pitch between each two adjacent actuators of the plurality of actuators or each two adjacent interaction regions of the plurality of interaction regions. For example, three actuators are located at 0°, 60° and 120°; and three interaction regions located at 1°, 62° and 123°. In other words, the pitch here is 1°.

In the non-limiting described example, either the actuators 310*a*-310C have a constant distance therebetween and the interaction regions 320A-320C have a variable distance therebetween or vice versa. Both options are valid.

In the non-limiting described example of FIGS. 1A-1G4, each of the three actuators 310A-310C is aligned with respect to the respective, associated interaction region 320A-320C in such a way that, at a given time, each actuator, if activated to engage with the associated, respective interaction region, touches firstly a different point in the interaction region and causes a specific incremental rotation characterized by at least a different angular distance or a different angular direction. This can be seen in FIGS. 1E1 to 1E3 that illustrate the device 10 prior to activation of anyone of the actuators 310A-310C, i.e. the momentary alignments between the actuators and the associated interaction regions of FIG. 1B are illustrated. FIG. 1E1 is a close-up view of the actuator 310A and the associated interaction region 320A; FIG. 1E2 is a close-up view of the actuator 310B and the associated interaction region 320B; and FIG. 1E3 is a close-up view of the actuator 310C and the associated interaction region 320C.

FIG. 1E1 illustrates the momentary alignment between the actuator 310A and interaction region 320A. As can be understood from FIG. 1E1, when the actuator 310A is activated, it interacts/engages with the interaction region 320A at the interaction point 320A1. Since the interaction region is static (having a fixed spatial relationship with the stator portion), and the actuator is rotatable (having a fixed spatial relationship with the rotor portion), the activation of the actuator 310A and engagement with the interaction region 320A at 320A1 causes the actuator to slide from interaction point 320A1 to point 320A2 where it stops, resulting in counterclockwise rotation of the rotor portion 200, for a specific angular distance determined by the structure of the interaction region 320A.

FIG. 1E2 illustrates the momentary alignment between the actuator 310B and interaction region 320B (concurrent with the alignment between actuator 310A and interaction action 320A, as well as between actuator 310C and interaction action 320C as illustrated in FIG. 1E3). As an be understood, if the actuator 310B is activated, it engages with the interaction region 320B at interaction point 320B1, and slides from interaction point 320B1 to point 320B2 where it stops, resulting in clockwise rotation of the rotor portion 200, for a specific angular distance determined by the structure of the interaction region 320B. For example, as appreciated the angular distance will be different from the angular distance caused if the actuator 310A is activated. However, as mentioned, at least one of the angular distance and angular direction should be different between the different actuators and interaction regions.

FIG. 1E3 illustrates the momentary alignment between the actuator 310C and interaction region 320C. When the actuator 310C is activated, it engages with the interaction region 320C at interaction point 320C1 and causes a rotation in counterclockwise angular direction until it stops at point 320C2. It is appreciated, that if the interaction regions 320A-320C are identically structured, the angular distance here is greater than the angular distances caused by the activation of actuators 310A and 310B.

In some examples, as will be illustrated further below in FIGS. 1F1-1F4 and 1G1-1G4, the plurality of actuators and the associated (respective) plurality of interaction regions are aligned such that at each given time after an actuator of the plurality of actuators is activated by the remote energy source to engage with the associated/respective interaction region and cause the IOL to rotate with a specific incremental rotation having specific angular distance and direction, a subsequent actuator of the plurality of actuators becomes aligned with its associated/respective interaction region and configured, when being activated by the remote energy source to engage with its associated/respective interaction region, to cause the IOL to rotate with the same specific incremental rotation having the same specific angular distance and angular direction.

In some examples, as will also be illustrated in FIGS. 1F1-1F4 and 1G1-1G4, at least some actuators of the plurality of actuators when being sequentially activated in a specific activation order, to sequentially engage with the associated plurality of interaction regions, they cause the IOL to rotate in sequential incremental rotations having equal angular distances and same angular direction.

FIG. 1F1 shows the device 10 at time "0" before any actuator is activated to engage with the associated interaction region. As well appreciated from the close-up views of all actuators and respective interaction regions, each one of the actuators 310A-310C is aligned differently with respect to the associated interaction regions 320A-320C. In each close-up view, an arrow indicates the specific portion of the interaction region with which the respective actuator will interact. The arrow indicates to that specific portion of the interaction region in all figures, before during and after the interaction occurs. As such, arrow AR1 indicates the portion in the interaction region 320A where the engagement between the actuator 310A and the interaction region 320A will take place; arrow AR2 indicates the portion in the interaction region 320B where the engagement between the actuator 310B and the interaction region 320B will take place; arrow AR3 indicates the portion in the interaction region 320C where the engagement between the actuator 310C and the interaction region 320C will take place.

FIGS. 1F2-1F4 illustrate a clockwise rotation of the rotor portion, in three incremental, equal clockwise rotations of the rotor portion, as a result of three sequential activations of the three actuators 310A-310B-310C in this timely order.

FIG. 1F2 shows the end position of the engagement of actuator 310A with the interaction region 320A. As appreciated the actuator reaches the lowest point 320AL in the relevant portion of the interaction region 320A where no further movement can occur. Another activation of the actuator 310A will not result in any relative movement between the rotor and stator portions, in other words, it will result in zero movement therebetween. Before the actuator 310B is activated to engage with the interaction region 320B, as shown in FIG. 1F3, the actuator 310A is relaxed and disengaged from the interaction region 310A as will be explained further below. FIG. 1F2 also illustrates the new alignment between actuator 310B and interaction region 320B that will affect a subsequent incremental clockwise rotation having the same angular distance as with the engagement between the actuator 310A and interaction region 320A.

Similarly, FIG. 1F3 illustrates the sequential activation of actuator 310B, and its end position during the engagement with the interaction region 320B, resulting in a second incremental clockwise rotation of the rotor portion. FIG. 1F4 illustrates the sequential activation of actuator 310C, and its end position during the engagement with the interaction region 320C, resulting in a third incremental clockwise rotation of the rotor portion. As appreciated from FIG. 1F4, the actuator 310A has a similar alignment with respect to the interaction region 320A as in FIG. 1F1 enabling another cycle or partial cycle of the incremental rotations as needed. On the other side, activation of the actuator 320B will result in counterclockwise incremental rotation enabling correcting the position of the IOL in the opposite direction and so on.

Going over FIGS. 1G1-1G4, it will be appreciated that they represent a similar activation series of the actuators to affect sequential counterclockwise incremental rotations of the rotor portion. Here, the actuators are sequentially activated in a reverse order, i.e. 310C-310B-310A. FIG. 1G1 illustrates the device at time "0"; FIG. 1G2 illustrates the end position of the engagement of actuator 310C with the interaction region 320C that results in incremental counterclockwise rotation of the rotor portion; FIG. 1G3 illustrates the end position of the engagement of actuator 310B with the interaction region 320B that results in a second incremental counterclockwise rotation of the rotor portion; and FIG. 1G4 illustrates the end position of the engagement of actuator 310A with the interaction region 320A that results in a third incremental counterclockwise rotation of the rotor portion. As appreciated, the actuator 310C returns after the three incremental rotations to a similar alignment with respect to the interaction region 320C as in FIG. 1G1 enabling another cycle or partial cycle of the counterclockwise incremental rotations as needed. On the other side, activation of the actuator 320B will result in clockwise incremental rotation enabling correcting the position of the IOL in the opposite direction and so on.

In some embodiments, as will be exemplified further below, at least some actuators of the plurality of actuators are unidirectional such that when being individually activated, to engage with the associated plurality of interaction regions, they cause the IOL to rotate in same specific angular direction, i.e. they are operable to rotate the IOL only in one of the clockwise or counterclockwise directions. When utilizing unidirectional actuators, the plurality of actuators may all be unidirectional in the same angular direction, or the plurality of actuators may include a first group of unidirectional actuators operable to cause the IOL to rotate in clockwise direction, when being sequentially activated to engage with the associated plurality of interaction regions, and a second group of unidirectional actuators operable to cause the IOL to rotate in counterclockwise direction, when being sequentially activated to engage with the associated plurality of interaction regions.

In some embodiments, at least some actuators of the plurality of actuators are bidirectional such that when being individually activated to engage with the associated plurality of interaction regions, they cause the IOL to rotate either in clockwise or counterclockwise angular direction based on their temporary alignment with respect to the associated interaction region.

In some embodiments, at least some actuators of the plurality of actuators have a length dimension defining the actuator as being unidirectional actuator or bidirectional actuator configured, when being activated by said remote energy source, to cause the IOL to rotate in respectively one or two angular directions. An example will be provided further below.

In the described example of FIGS. 1A-1G4, all the actuators 310A-310C are bidirectional. As described above, each one of the actuators can cause the IOL to rotate in clockwise or counterclockwise directions depending on the temporary alignment between the actuator and the associated interaction region. As seen in the figures (e.g. FIGS. 1E1 and 1E2), when being activated, the actuators extend towards the interaction region along a linear, straight activation path LAP (in FIGS. 1E1, 1E2), therefore being bidirectional and capable of engaging with the interaction region to affect both clockwise and counterclockwise rotations depending on their temporary alignment with the interaction region.

According to the invention, the actuators are activated, when exposed to energy from the energy source. In some embodiments, the actuators, or at least activable portion(s) thereof, shift from a first, resting (disengaged) spatial configuration (e.g. actuator 310A in FIG. 1F1) into a second, activated (engaged) spatial configuration (e.g. actuator 310A in FIG. 1F2) in which a contact and engagement of the actuator, or at least a portion thereof, with the interaction region occurs at a specific point to cause the specific rotational movement having an angular distance and an angular direction.

The actuators are also configured to return from the second, engaged spatial configuration into the first, disengaged spatial configuration, once the engagement with the interaction region achieves the specific rotational movement. In some embodiments, the actuator includes an actuator elastic portion in communication with the actuator activable portion, the actuator elastic portion being operable to return the actuator activable portion from the second, activated spatial configuration into the first, resting spatial configuration once the actuator activable portion is no more activated by said remote energy source. In some embodiments, the elastic portion acts like a spring that forces the activable portion back to the resting spatial configuration. In some embodiments, as will be exemplified further below, the actuator elastic portion is operable to engage with the associated interaction region, when the actuator activable portion is activated by the remote energy source, to cause the IOL to rotate with the incremental rotation. In other words, either the activable portion or the elastic portion may be configured to engage with the interaction region and cause the rotational movement.

In the described example of FIGS. 1A-1G4, the actuators include both activable portion and elastic portion. As illustrated in FIGS. 1C, 1D and 1E1 for example, the actuator 310A includes an activable portion 310AA that is configured to be activated by the energy source, and an elastic portion 310AE that is configured to hold the activable portion 310AA in place, when in the resting spatial configuration, and force the activable portion 310AA back from the activated spatial configuration (shown for example in FIG. 1F2) into the resting spatial configuration by applying an elastic force thereon. As shown, in this example, the elastic portion 310AE forms an integral part of the rotor portion 200, and the activable portion 310AA is a separate element being confined in between two members EM1 and EM2 of the elastic portion 310AE.

In some embodiments, to enable the resting and activated spatial configurations and the shifting therebetween, the actuator, specifically the activable portion, can be made, partially or totally, from a shape-memory material and/or bi-metal material operable to provide the second activated spatial configuration once the activable portion is exposed to energy from the remote energy source.

In some embodiments, the stator portion includes super-elastic material. In some embodiments, the rotor portion includes super-elastic material. The super-elastic material enables the device, or major portions thereof, to be foldable under application of certain amount of external forces and to return to their original shape without deformation once the external forces are removed.

In some embodiments, the shape-memory material is a specifically designed Nitinol (Nickel Titanium alloy), chosen for its biocompatibility and design flexibility. In some embodiments, the super-elastic material is a specifically designed Nitinol or a bi-metal.

Nitinol can be designed to be a super-elastic material at a specific temperature range, and a shape-memory material at a specific temperature range. In general, Nitinol is configured to change its structure from martensitic phase to austenitic phase under gradient of a few Celsius degrees. The gradient of temperatures and the phases transformation temperatures can be programmed according to the requirements. For example, the Nitinol Alloy can be designed such that up to about 40° C. it is in martensite phase being fictile and can be shaped to a desired shape under external forces. On the other side, raising the temperature to about 60° C. causes phase transition into austenite phase where Nitinol changes its shape (deforms) to take a shape saved in its "memory" even while under certain amount of external forces, e.g. forming the second activated spatial configuration of the activable portion of the actuator. Once the temperature returns to about 40° C., the Nitinol returns back to its fictile state and can be reshaped as desired providing the resting spatial configuration. The stator and rotor portions can be designed to be super-elastic around room temperature, such that they can be folded while being inserted into the lens capsule. For example, the device can be configured to be foldable such that it can be passed through a cross-section of about 2.54 mm$^2$ area (equivalent to 1.8 mm circular diameter, though the cross-section can take an oval-like shape).

The interaction region is configured to enable rotational movement of the rotor portion as a result of the engagement between the actuator and the interaction region. In some embodiments, at least some interaction regions are defined by a series of ridges/teeth protrusions. Each two adjacent teeth protrusions are separated by a single depression/valley therebetween. In some embodiments, the plurality of interaction regions may be defined by different series of ridges/teeth protrusions having different sizes. In some embodiments, the teeth protrusions in an interaction region are symmetrical. In some embodiments, the teeth protrusions in an interaction region are asymmetrical. The asymmetrical configuration is advantageous when the movement system includes only two actuators and two respective interaction regions, because this way it enables the actuators to move between adjacent teeth to rotate the IOL along long angular distances.

In the non-limiting example of FIGS. 1A-1G4, the interaction regions 320A-320C are configured as identical series of symmetrical teeth protrusions. For example, FIG. 1E4 illustrates the teeth protrusions in the interaction region. Two teeth protrusions 320BT1 and 320BT2 are separated by a valley point 320BV. Each tooth has a top point defining the highest contact/engagement points between the actuator and the interaction region. Top point 320BTT of tooth 320BT2 is illustrated. The valley point 320BV defines the end contact/engagement point of the actuator with the interaction region. Each side of the tooth defines the engagement path which is maximal between the tooth top point and the valley point. The actuator can contact/engage with the tooth at any point between the top point and the valley point that serves as the end of the movement each time an actuator engages with the interaction region. Accordingly, it is understood that in this non-limiting example, each actuator can be activated once and a subsequent activation of the same actuator will not result in relative movement between the rotor portion and the stator portion unless at least one other actuator (typically the next one in a series of actuators) is activated after the first activation of the actuator.

The above-described configuration of the interaction region, being formed by a series of ridges/teeth protrusions separated by a series of depression/valley points, enables having relatively big/large features (ridges/teeth) of the interaction region, thereby facilitating the manufacturing process of the device, while still achieving small incremental rotational movements of the IOL, since each engagement between the actuator and the interaction region results in relative movement of the actuator over a fraction of the feature (ridge/tooth) of the interaction region. In some embodiments, the actuators are aligned with respect to the interaction regions such that almost half of the ridge/tooth, a third or a quarter is the engagement path. In some embodiments, each ridge/tooth protrusion defines an incremental rotation of angular distance being equivalent to or greater than an angle of 0.6°. In some embodiments, the incremental rotation (forming a fraction of the tooth/ridge) has an angular distance being equivalent to or greater than an angle of 0.3°. While not specifically shown, the stator and/or the rotor portions can be equipped with scale marks that aid the operator of the device in identifying the exact angular position (both old and new, before and after displacement) of the IOL.

It is appreciated that while each actuator has its respective interaction region, this is descriptive and mainly functional, and it can be the case that structurally a single continuous interaction region is provided, e.g. a circular interaction region extending over the whole inner perimeter of the stator portion, with which the plurality of actuators interact.

The remote energy source ES is configured and operable to provide activation energy to the plurality of actuators. Typically, each actuator is activated individually. In some embodiments, the remote energy source ES requires direct/uninterrupted line of sight/route between the remote energy source and the actuator being remotely activated, while in some other embodiments, there is no such requirement and the activation can be achieved without direct line of sight. In some embodiments, the remote energy source ES is configured and operable to provide the activation energy in the form of heat. This is particularly important in case the actuators are made from Nitinol, as mentioned above. In some embodiments, the remote energy source ES includes at least one radiating element operable to heat the actuators by irradiating them. In some embodiments, the remote energy source ES includes an electromagnetic radiation transmitter and the plurality of actuators include corresponding electromagnetic radiation receivers. In some embodiments, the remote energy source ES is a laser source. In some embodiments, the laser source is configured and operable to provide continuous laser radiation. In some embodiments, the laser source is configured and operable to provide a green spectrum of light (the so-called Argon laser). In some embodiments, the laser source comprises one or more laser diodes. In some embodiments, the laser source is configured and operable to produce laser having the following parameters: laser power between 0.1-5 watt, laser pulse width between 200-1000 ms.

Figure 2A:
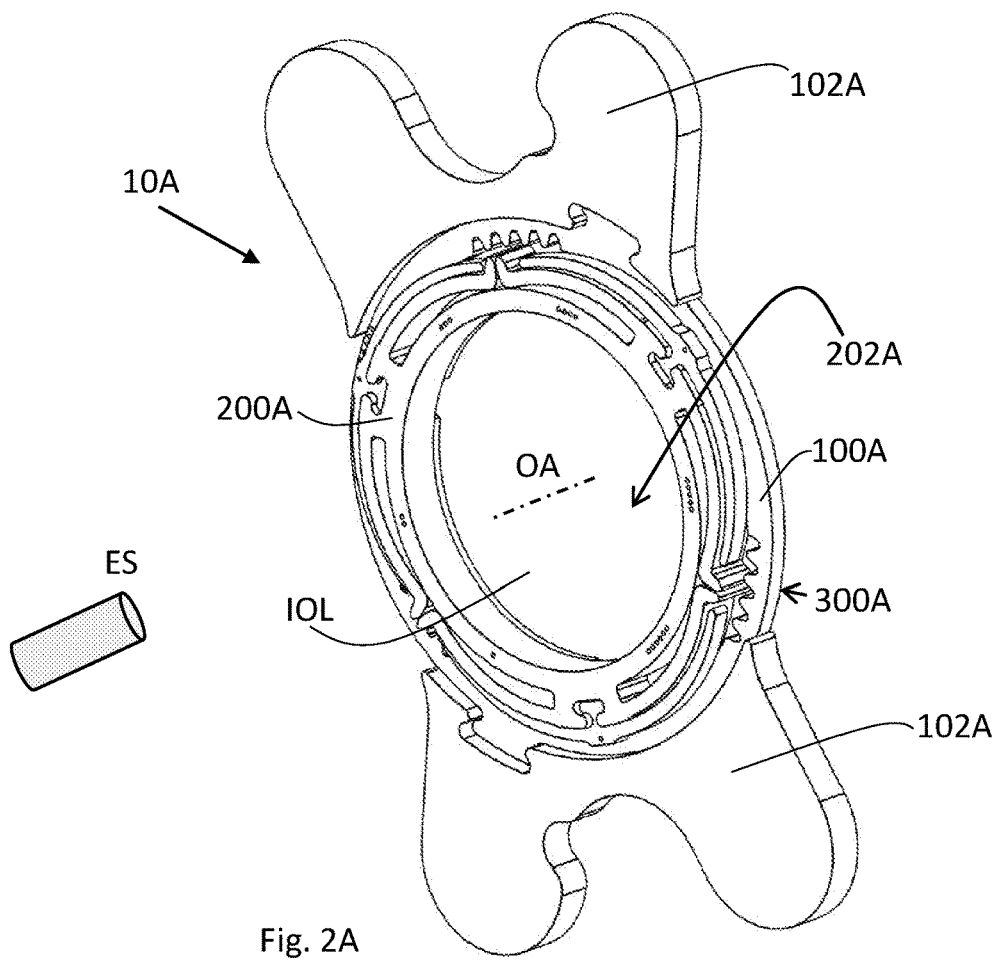
FIGS. 2A-2D illustrate a second non-limiting example of a device configured to hold an IOL and operable to remotely adjust position of the IOL after it has been implanted inside an eye, in accordance with the invention.
Figure 2B:
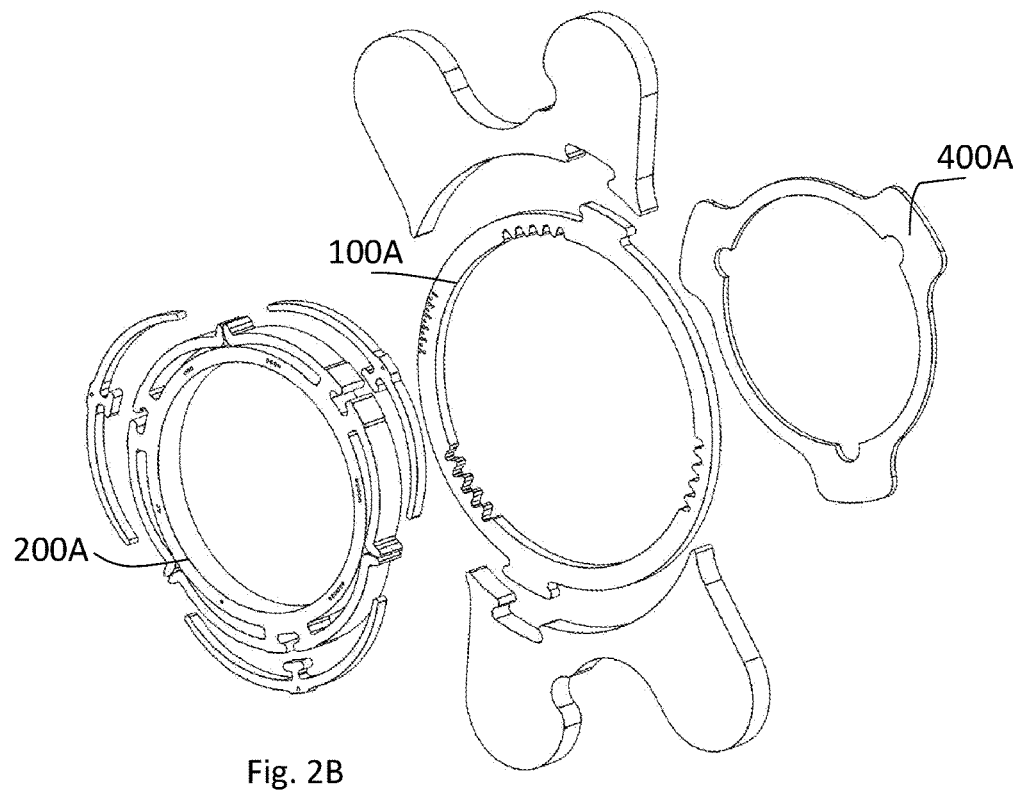
Figure 2C:
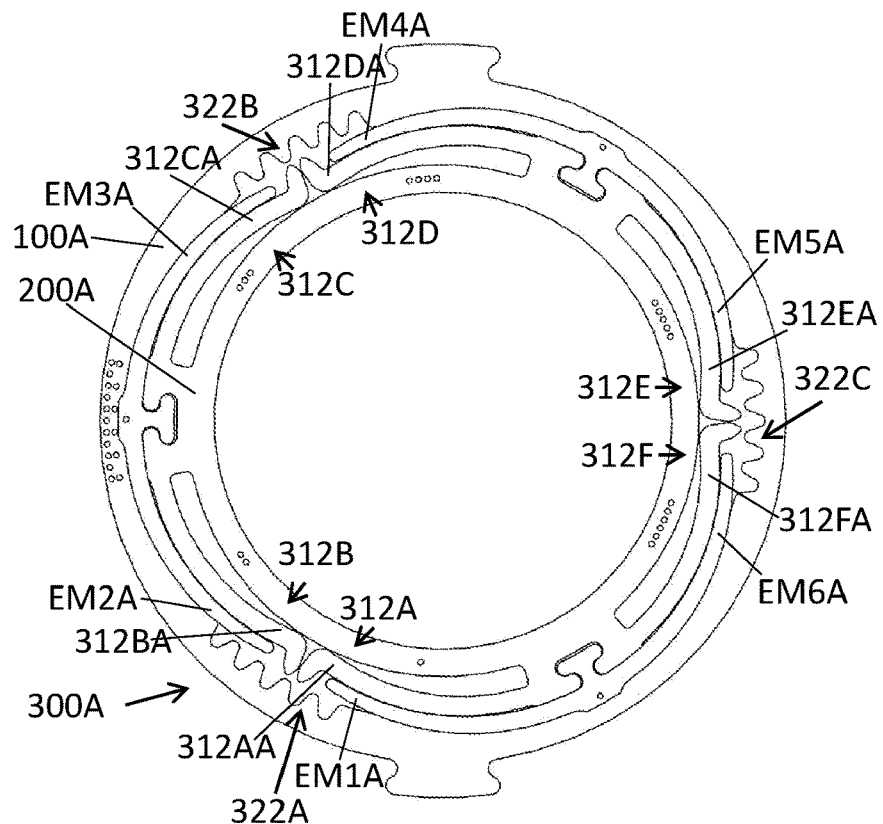
Figure 2D:
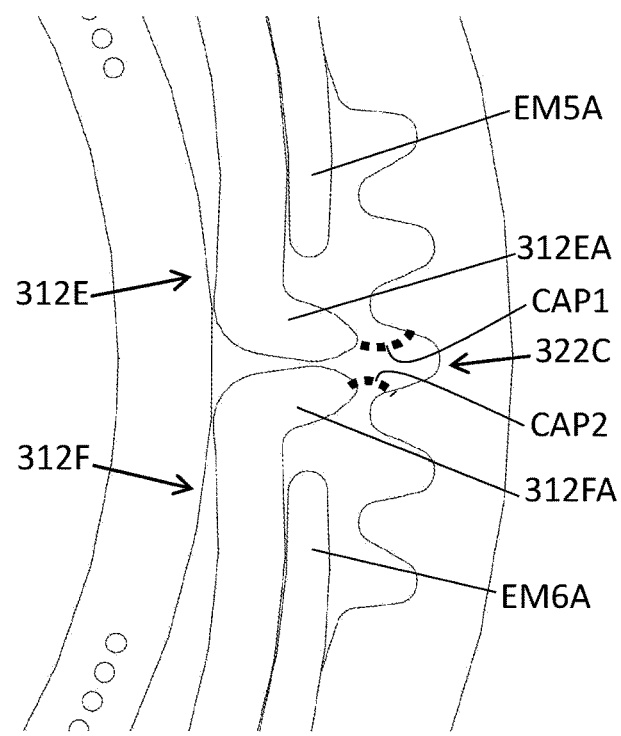

Reference is made to FIGS. 2A-2D illustrating another non-limiting example of a device 10A incorporating features of the present invention. FIG. 2A is a perspective view of the device 10A; FIG. 2B is an exploded view; FIG. 2C illustrates the rotor and stator portions as well as the movement system; and FIG. 2D is a close-up view on the movement system.

As shown in FIG. 2A, the device 10A includes a cavity 202A configured to receive the IOL, and is operable to rotate the IOL, around an optical axis OA of the IOL, by absorbing energy from the remote energy source ES (which is not part of the device 10A, as described above). The device 10A includes an outer stator portion 100A, an inner rotor portion 200A, and a movement system 300A operable, by the remote energy source ES, to rotate the inner rotor portion 200A that is fixedly attached to the IOL with respect to the outer stator portion 100A that is fixedly positioned inside the lens capsule of the eye by help of two haptics 102A fixedly attached thereto.

In this example, as shown in FIG. 2B, the device 10A also includes a back cover 400A configured and operable to limit displacement of the rotor portion 200A in the axial direction (along the direction of the optical axis OA). The back cover as well as a front cover (not shown) can be fitted with any of the described examples of devices herein, to thereby control and limit axial displacement of the rotor portion and possibly at least part of the movement system. The front and/or back covers can be static (attached to the stator portion) or rotatable (attached to the rotor portion).

As clearly shown in FIG. 2C, the movement system 300A, in this non-limiting example, includes six actuators 312A-312F. Each actuator includes an activable portion and an elastic portion operable as described above. Accordingly, the actuators 312A-312F include the activable portions 312AA-312FA and the elastic portions EM1A-EM6A respectively. In this non-limiting example, the activable portions of the actuators are integral with the rotor portion and the elastic portions are separate elements fixedly connected to the rotor portion.

A shown, the movement system 300A includes three interaction regions 322A-322C associated with the six actuators 312A-312F. The interaction regions are series of ridges/teeth protrusions similar to the interaction regions in the device 10. The interaction region 322A is associated with the actuators 312A and 312B; the interaction region 322B is associated with the actuators 312C and 312D; and the interaction region 322C is associated with the actuators 312E and 312F. As appreciated from FIG. 2C, each one of the actuators (at least the activable portion) is aligned differently with respect to the associated interaction region.

Each one of the actuators, in this non-limiting example, is unidirectional being capable, when engaging with the associated interaction region, to rotate the rotor portion and the IOL in one angular direction, either clockwise or counterclockwise. The reason is that the curved structure of the activable portion of the actuator is such that when it is activated, by the remote energy source, it moves in a curved line towards the interaction region and not along a straight linear line like the actuators included in the device 10, the curved path enables the activable portion of the actuator to engage only with one side of the ridge/tooth. Actuators 312A, 312C and 312E cause the rotor portion and the IOL to rotate clockwise, and the actuators 312B, 312D and 312F cause the rotor portion and the IOL to rotate counterclockwise. FIG. 2D illustrates the unidirectional nature of the actuators of device 10A. As shown, when the actuator 312E with its activable portion 312EA is activated, it moves along a curved activation path CAP1 that is counterclockwise (to the left side of the activable portion 312EA) and engages with the left side of the tooth. As mentioned above, this engagement between the activable portion 312EA and the ridge/tooth will cause the rotor portion to rotate clockwise. In comparison, when the actuator 312F with its activable portion 312FA is activated, it moves along a curved activation path CAP2 that is clockwise (to the right side of the activable portion 312FA) and engages with the right side of the tooth. As mentioned above, this engagement between the activable portion 312FA and the ridge/tooth will cause the rotor portion to rotate counterclockwise.

The rest of features described with respect to the device 10 are also applicable with respect to the device 10A, though not specifically described.

Figure 3A:
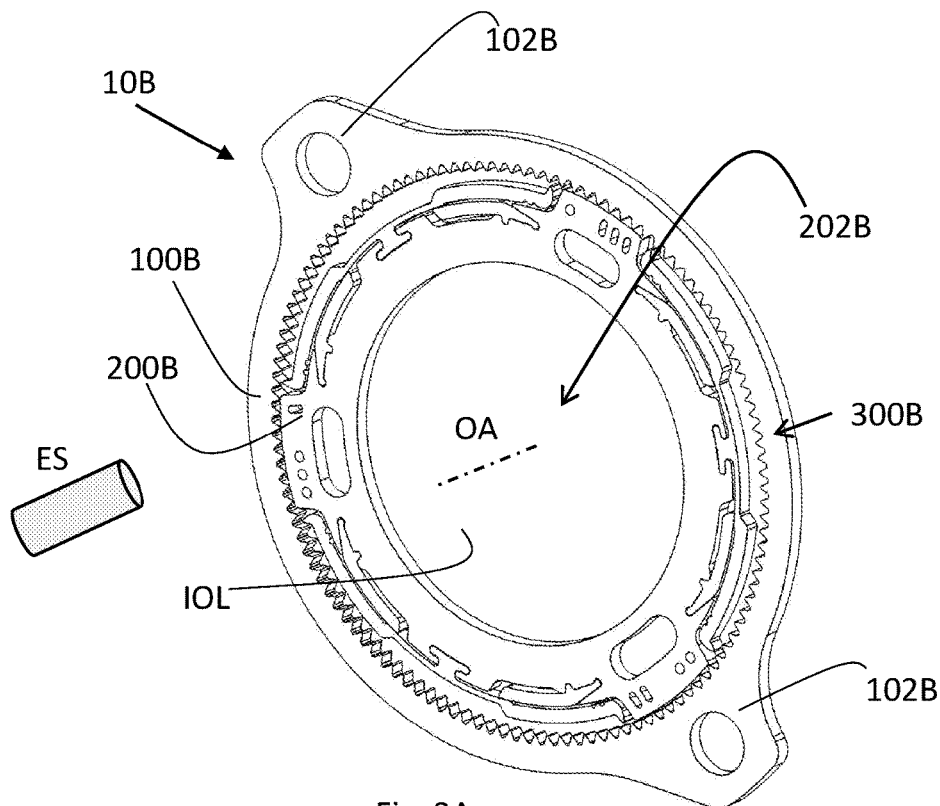
FIGS. 3A-3D illustrate a third non-limiting example of a device configured to hold an IOL and operable to remotely adjust position of the IOL after it has been implanted inside an eye, in accordance with the invention.
Figure 3B:
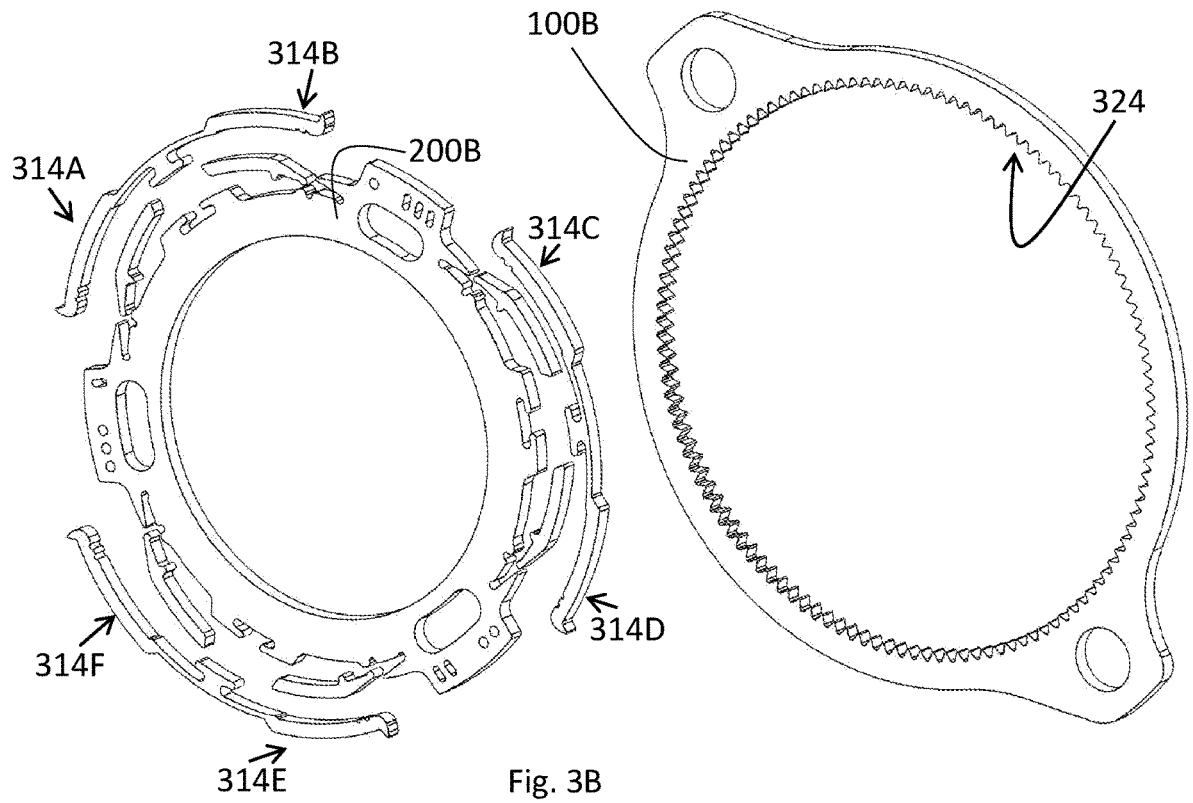
Figure 3C:
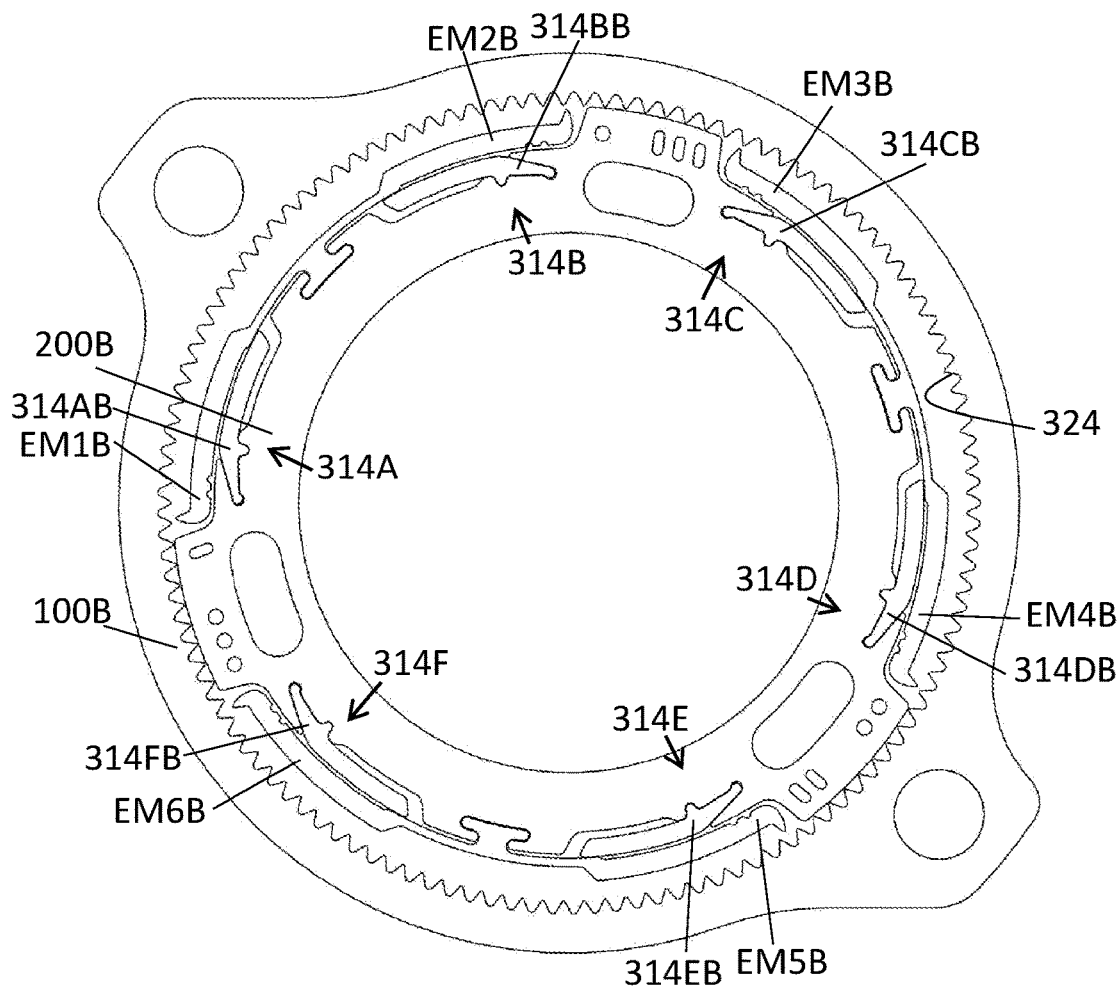
Figure 3D:
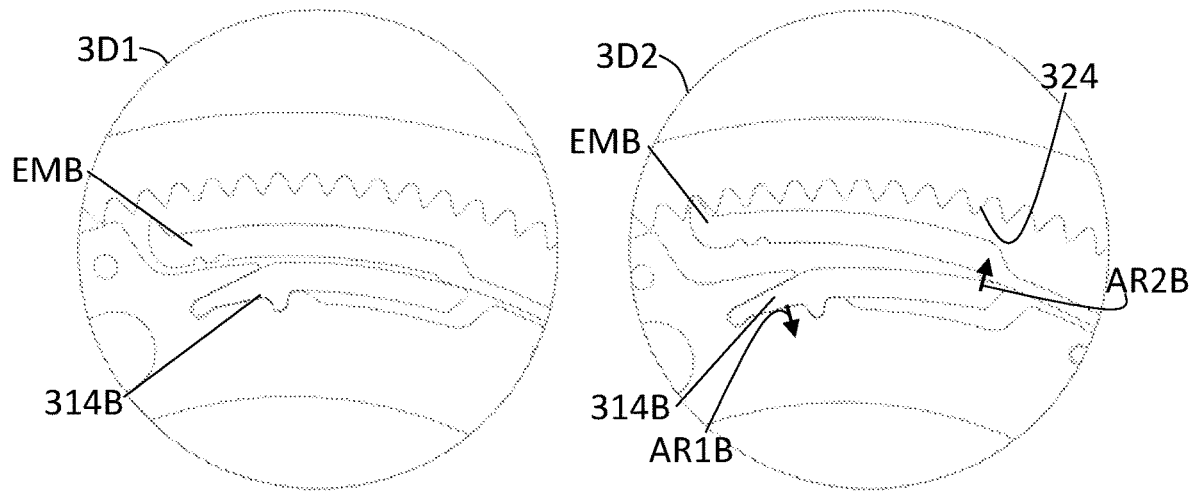

Reference is made to FIGS. 3A-3D illustrating another non-limiting example of a device 10B incorporating features of the present invention. FIG. 3A is a perspective view of the device 10B; FIG. 3B is an exploded view; FIG. 3C illustrates the rotor and stator portions as well as the movement system; and FIG. 3D is a close-up view on the movement system.

As shown in FIG. 3A, the device 10B includes a cavity 202B configured to receive the IOL, and is operable to rotate the IOL, around an optical axis OA of the IOL, by absorbing energy from the remote energy source ES (which is not part of the device 10B, as described above). The device 10B includes an outer stator portion 100B, an inner rotor portion 200B, and a movement system 300B operable, by the remote energy source ES, to rotate the inner rotor portion 200B that is fixedly attached to the IOL with respect to the outer stator portion 100B that is fixedly positioned inside the lens capsule of the eye by help of two haptics (not shown) being attachable to the attachment portions 102B forming integral parts of the stator portion 100B.

FIG. 3B shows exploded view of the device 10B and illustrates the movement system 300B including the round/circular interaction region 324 that is associated with all actuators and forms an integral part of the stator portion 100B and is formed by a series of ridges/teeth protrusions spaced-apart by depressions/valleys as described above. The movement system also includes the six actuators 314A-314F that are unidirectional actuators similar to the actuators of device 10A, as will be further described below.

As clearly shown in FIG. 3C, in the movement system (300B in FIG. 3A), in this non-limiting example, each actuator includes an activable portion and an elastic portion operable as described above. Accordingly, the actuators 314A-314F include the activable portions 314AB-314FB and the elastic portions EM1B-EM6B respectively. In this non-limiting example, both the activable portions and the elastic portions of the actuators are separate elements fixedly connected to the rotor portion so that they rotate together around the optical axis OA of the lens.

In this non-limiting example, as illustrated in FIG. 3D, the elastic portion of the actuator is the actuator's part that engages with the interaction region to cause the rotational movement of the rotor portion and the IOL. Close-up view 3D1 shows an actuator in its deactivated state, and Close-up view 3D2 shows the actuator in its activated state where the activable portion 314B moves, when activated by the remote energy source, along arrows AR1B and AR2B, thereby pushing the elastic portion EMB towards the interaction region 324 such that the elastic portion EMB engages with a ridge/tooth of the interaction region and causes the rotor portion together with the IOL to rotate.

As shown in FIG. 3C, for example, each one of the actuators is aligned differently with respect to the interaction region, such that when engaging with the interaction region it causes an incremental rotation having a different angular distance or angular direction. Each one of the actuators, in this non-limiting example, is unidirectional being capable, when engaging with the associated interaction region, to rotate the rotor portion and the IOL in one angular direction, either clockwise or counterclockwise. The reason is that the curved structure of the elastic portion of the actuator is such that when it is forced to move by the activated activable portion, it moves in a curved line towards the interaction region (as explained in FIG. 2D above but with regard to the activable portion of the actuator), and not along a straight linear line like the actuators included in the device 10, the curved path enables the elastic portion of the actuator to engage only with one side of the ridge/tooth. Actuators 314A, 314C and 314E cause the rotor portion and the IOL to rotate counterclockwise, and the actuators 314B, 314D and 314F cause the rotor portion and the IOL to rotate clockwise.

The rest of features described with respect to the device 10 are also applicable with respect to the device 10B, though not specifically described.

Figure 4A:
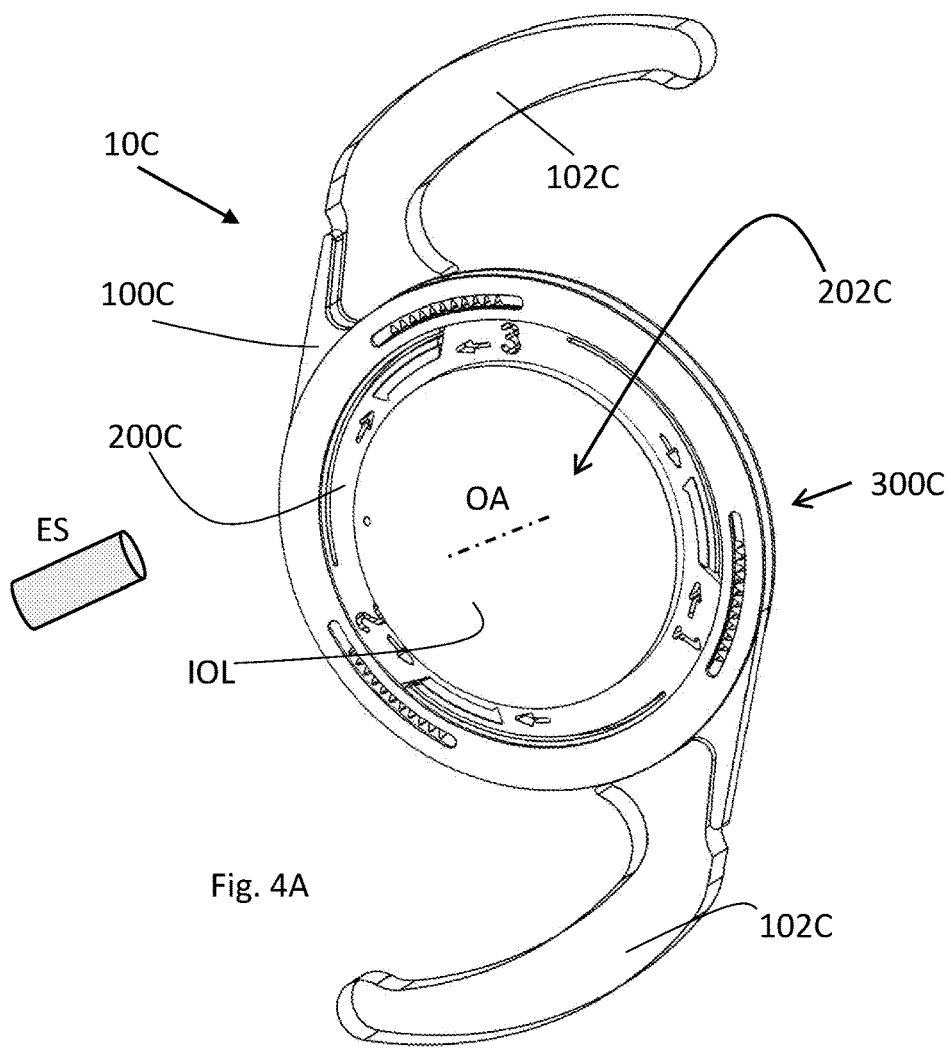
FIGS. 4A-4C illustrate a fourth non-limiting example of a device configured to hold an IOL and operable to remotely adjust position of the IOL after it has been implanted inside an eye, in accordance with the invention.
Figure 4B:
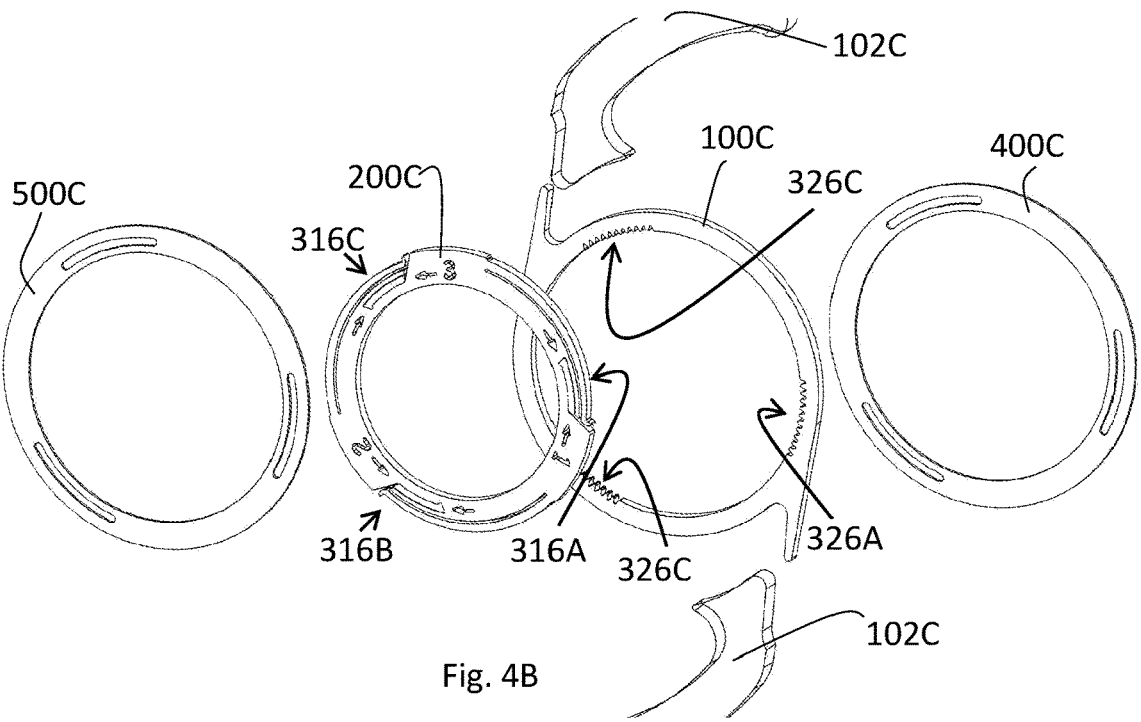
Figure 4C:
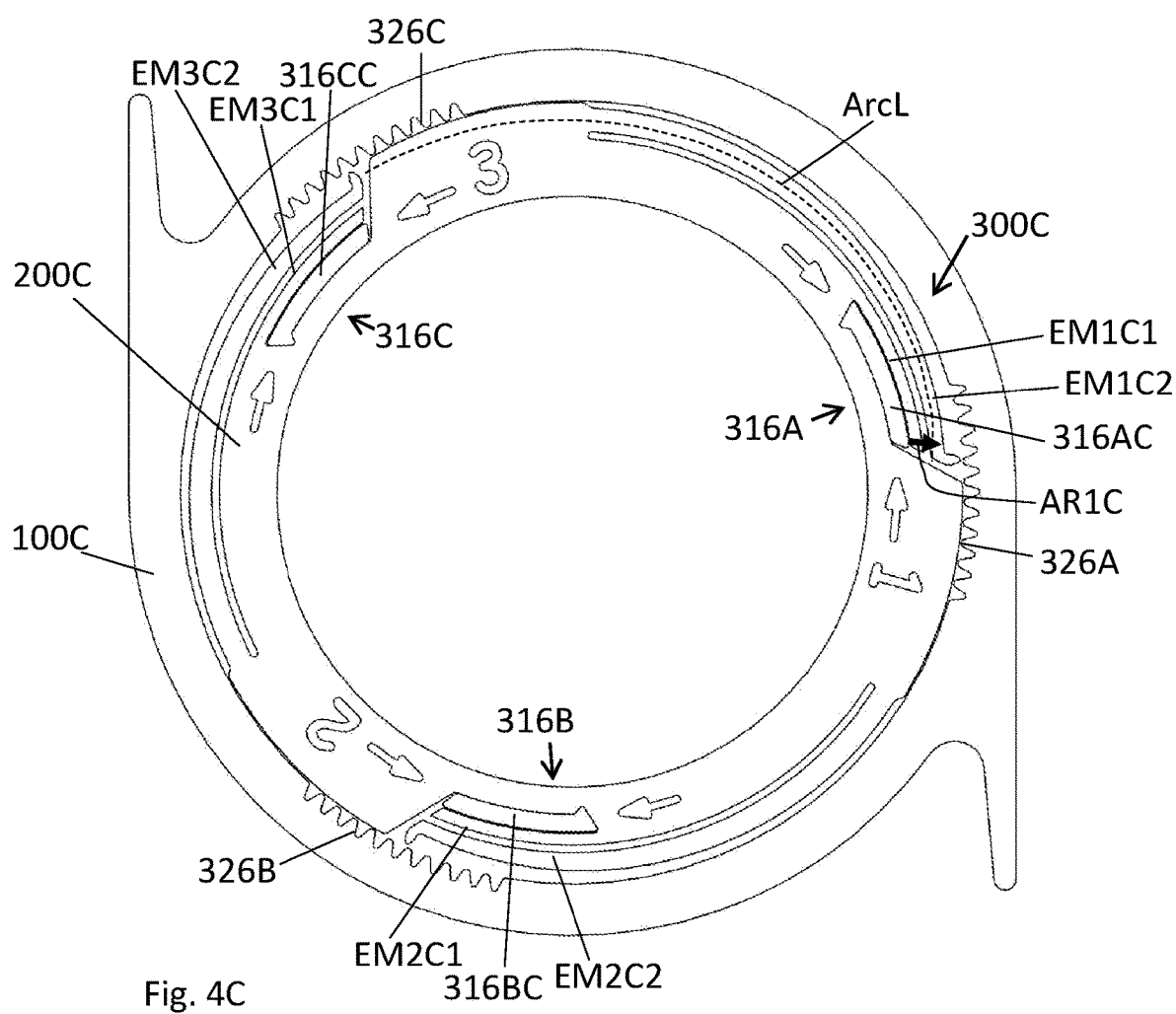

Reference is made to FIGS. 4A-4C illustrating another non-limiting example of a device 10C incorporating features of the present invention. FIG. 4A is a perspective view of the device 10C; FIG. 4B is an exploded view; and FIG. 4C illustrates the rotor and stator portions as well as the movement system 300C.

As shown in FIG. 4A, the device 10C includes a cavity 202C configured to receive the IOL, and is operable to rotate the IOL, around an optical axis OA of the IOL, by absorbing energy from the remote energy source ES (which is not part of the device 10C, as described above). The device 10C includes an outer stator portion 100C, an inner rotor portion 200C, and a movement system 300C operable, by the remote energy source ES, to rotate the inner rotor portion 200C that is fixedly attached to the IOL with respect to the outer stator portion 100C that is fixedly positioned inside the lens capsule of the eye by help of two haptics 102C fixedly attached thereto.

FIG. 4B shows exploded view of the device 10C and illustrates the movement system 300C including three interaction regions 326A-326C that are associated respectively with the three actuators 316A-316C.

In this example, as shown in FIG. 4B, the device 10C also includes a front cover 500C and a back cover 400C both configured and operable to control and limit displacement of the rotor portion 200C in the axial direction (along the direction of the optical axis OA).

As shown in FIG. 4B and FIG. 4C, the interactions regions 326A-326C form integral parts of the stator portion 100C and each is formed by a series of ridges/teeth protrusions spaced-apart by depressions/valleys as described above.

As clearly shown in FIG. 4C, in the movement system 300C, in this non-limiting example, each actuator includes an activable portion operable as described above and an elastic portion operable to engage with the interaction region and to return the activable portion to its resting spatial configuration. Accordingly, the actuators 316A-316C include respectively the activable portions 316AC-316CC and the elastic portions EM1C1-EM3C2. In this non-limiting example, the activable portions 316AC-316CC of the actuators are separate elements fixedly received within suitable pockets in the rotor portion 200C so that they rotate together around the optical axis OA of the lens, and the elastic portions EM1C1-EM3C2 are integral parts of the rotor portion 200C.

In this non-limiting example, as with the example of FIGS. 3A-3D above, the elastic portion of the actuator is the actuator's part that engages with the interaction region to cause the rotational movement of the rotor portion and the IOL. When the activable portions are activated, by the remote energy source, they deform and push the elastic portions towards engaging with the interaction region. The elastic portion in this example includes two sub-portions, one elastic sub-portion that is in touch with the activable portion to force the activable portion back into the resting spatial configuration, these sub-portions are EM1C1, EM2C1 and EM3C1 as shown in the figure. A second elastic sub-portion is a long arm that engages with the interaction region, these sub-portions are EM1C2, EM2C2 and EM3C2 as shown in the figure. One of the reasons for the two sub-portions is that longer arms are weaker and may practically be non-effective in forcing the activable portions back to the resting spatial configuration. For example, as shown, the activable portion 316AC, when activated, moves in the direction of arrow AR1C and pushes the elastic portions EM1C1 and EM1C2 towards the interaction region 326A such that the elastic portion EM1C2 engages with a ridge/ tooth of the interaction region and causes the rotor portion together with the IOL to rotate.

As shown in FIG. 4C, for example, each one of the actuators is aligned differently with respect to the respective interaction region, such that at each given time, each actuator causes, when engaging with the respective interaction region, an incremental rotation having a different angular distance or angular direction.

Each one of the actuators, in this non-limiting example, is bidirectional being capable, when engaging with the associated interaction region, to rotate the rotor portion and the IOL in clockwise or counterclockwise depending on the temporary alignment between the actuator and the associated interaction region. The actuators are bidirectional because of the high length of the elastic portions. As appreciated, each elastic portion extends over about third of the inner perimeter of the rotor portion. As illustrated, the length of the elastic portion EM1C2 corresponds to the length of ArcL that extends over third circle. The high length of the elastic portion causes its tip that engages with the interaction region to move in a substantially straight path, and not a curved path, when it is forced to move by the activated activable portion. The straight path enables the elastic portion of the actuator to engage with both sides of the ridge/tooth depending on their temporary alignment. The inventors have experimented and found that using two actuators each extending over about half of a circle or three actuators each extending over about third of a circle results in straight path of movement of the actuator part that engages with the associated interaction region.

The rest of features described with respect to the device 10 are also applicable with respect to the device 10C, though not specifically described.

Figure 5A:
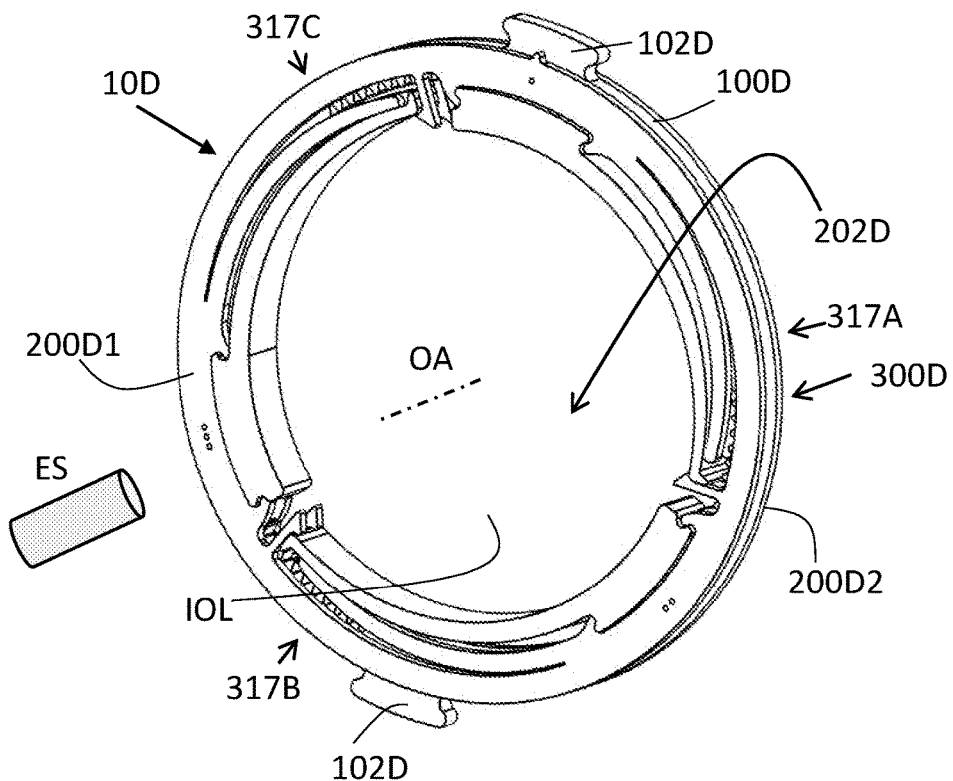
FIGS. 5A-5B illustrate a fifth non-limiting example of a device configured to hold an IOL and operable to remotely adjust position of the IOL after it has been implanted inside an eye, in accordance with the invention.
Figure 5B:
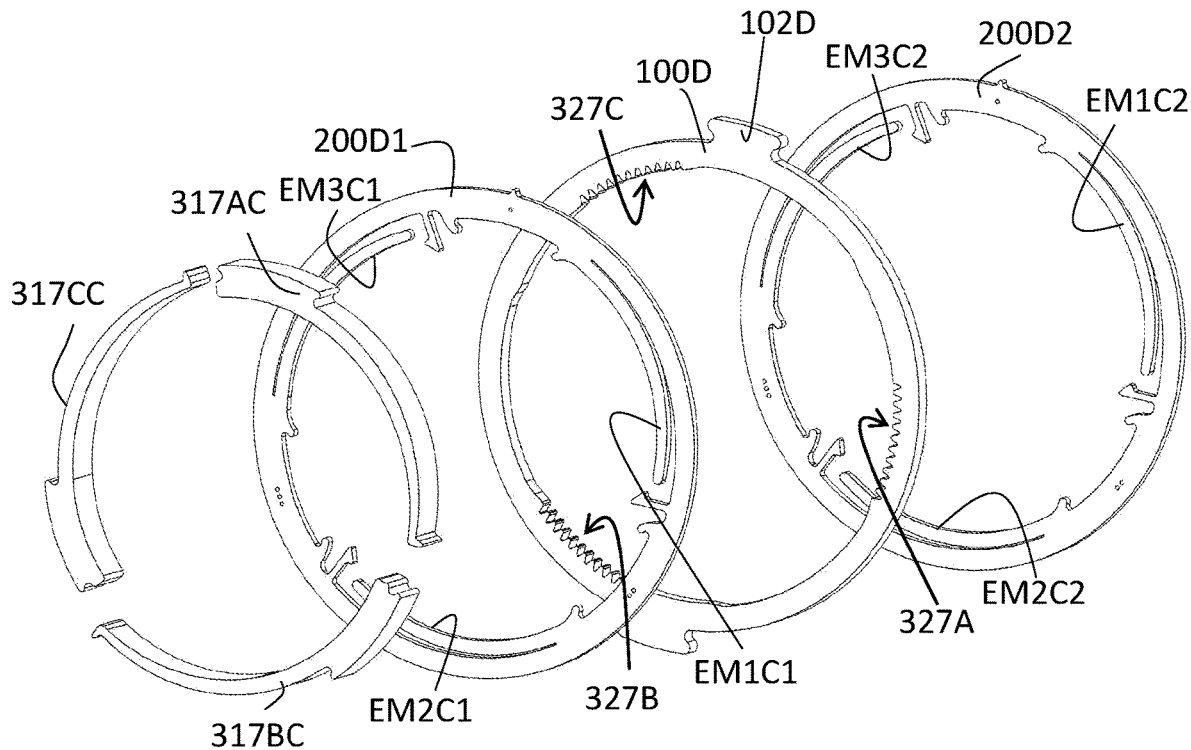

Reference is made to FIGS. 5A-5B illustrating another non-limiting example of a device 10D incorporating features of the present invention. FIG. 2A is a perspective view of the device 10D; and FIG. 2B is an exploded view illustrating the rotor and stator portions as well as the movement system.

As shown in FIG. 5A, the device 10D includes a cavity 202D configured to receive the IOL, and is operable to rotate the IOL, around an optical axis OA of the IOL, by absorbing energy from the remote energy source ES (which is not part of the device 10D, as described above). The device 10D includes a stator portion 100D, located between two rotor sub-portions 200D1 and 200D2, and a movement system 300D operable, by the remote energy source ES, to rotate the rotor sub-portions that are fixedly attached to the IOL with respect to the stator portion 100D that is fixedly positioned inside the lens capsule of the eye by help of two haptics that are attachable to two attachment portions 102D on the stator portion 100D.

In this example, as shown in FIG. 2B, the rotor portion is defined by two rotor sub-portions enclosing therebetween the stator portion. Accordingly, the two rotor sub-portions are configured and operable to limit displacement of the stator portion 100D in the axial direction (along the direction of the optical axis OA). The advantage of this configuration of device 10D is that the inner cavity is the biggest cavity possible enabling to accommodate bigger IOLs because the rotor sub-portions and the stator portion have substantially the same inner and outer diameters, whereas in other examples the rotor portion is smaller and surrounded by the stator portion.

Although two rotor sub-portions are used in this non-limiting example, it should be noted that in some other examples a single rotor portion can be used being located in front of or behind the stator portion. The advantage of the configuration described in FIGS. 5A-5B is increased stability and balanced structure.

As shown in FIGS. 5A-5B, the movement system 300D, in this non-limiting example, includes three actuators 317A-317C. Each actuator is operable similarly as described above and includes an activable portion and two elastic portions associated with the activable portion. Accordingly, the actuators 317A-317C include the three activable portions 317AC-317CC and the six elastic portions EM1C1-EM3C2, where each activable portion is associated with two elastic portions located on the first and second rotor sub-portions respectively. In this non-limiting example, the elastic portions of the actuators are integral with the rotor sub-portions and the activable portions are separate elements fixedly connected to the rotor sub-portions at dedicated regions such that they come in contact with the two associated elastic portions located at both sides of the stator portion. Each activable portion has a depth extending over the whole depth of the stator portion and the two rotor sub-portions (thereby increasing stability of the device).

A shown, the movement system 300D includes three interaction regions 327A-327C located on the stator portion and associated with the three actuators 317A-317C. The interaction regions are series of ridges/teeth protrusions similar to the interaction regions in the device 10. The interaction region 327A is associated with the actuator 317A; the interaction region 327B is associated with the actuator 317B; and the interaction region 327C is associated with the actuator7 317C. Again it noted that each one of the actuators (at least the activable portion) is aligned differently with respect to the associated interaction region.

Each one of the actuators, in this non-limiting example, is bidirectional being capable, when engaging with the associated interaction region, to rotate the rotor portion and the IOL in clockwise or counterclockwise depending on the temporary alignment between the actuator and the associated interaction region. The actuators are bidirectional because of the high length of the activable (and also elastic) portions. As appreciated, each activable portion extends over about third of the inner perimeter of the rotor sub-portion. This is similar to the bidirectional ability of the actuators of device 10C above.

The rest of features described with respect to the device 10 are also applicable with respect to the device 10D, though not specifically described.

Figure 6A:
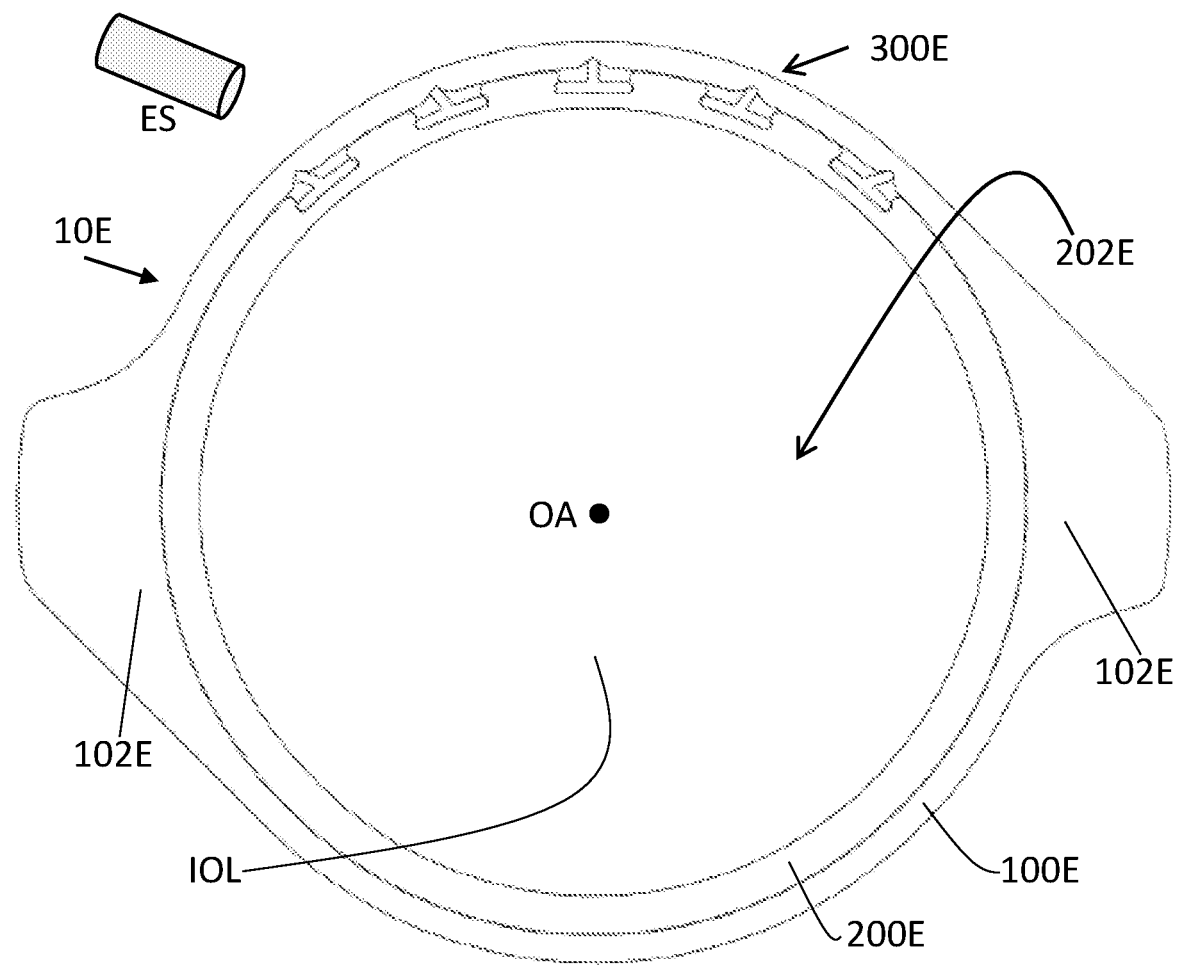
FIGS. 6A-6G illustrate a sixth non-limiting example of a device configured to hold an IOL and operable to remotely adjust position of the IOL after it has been implanted inside an eye, in accordance with the invention.
Figure 6B:
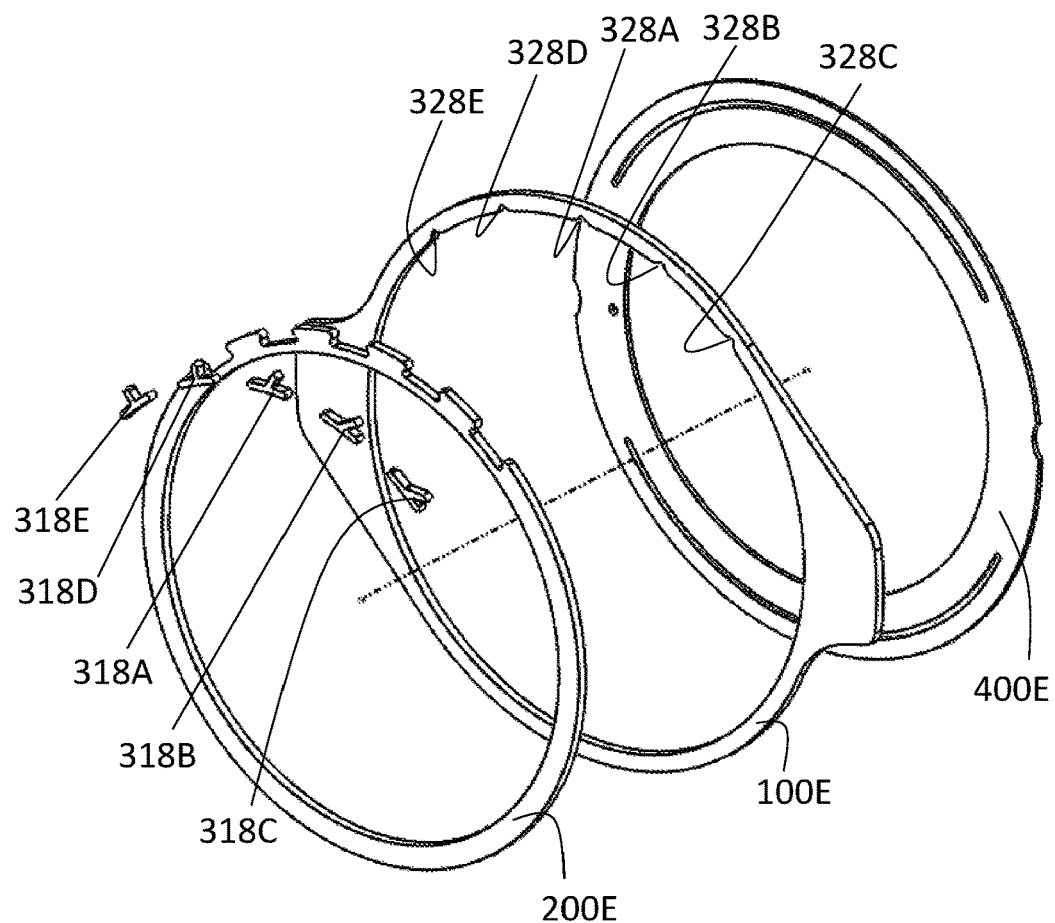

Reference is made to FIGS. 6A-6G illustrating another non-limiting example of a device 10E incorporating features of the present invention. FIG. 6A is a front view of the device 10E; FIG. 6B is an exploded view; and FIGS. 6C-6G illustrate the movement system and different rotations of the IOL around its optical axis.

As shown in FIG. 6A, the device 10E includes a cavity 202E configured to receive the IOL, and is operable to rotate the IOL, around an optical axis OA of the IOL, by absorbing energy from the remote energy source ES (which is not part of the device 10E, as described above). The device 10E includes an outer stator portion 100E, an inner rotor portion 200E, and a movement system 300E operable, by the remote energy source ES, to rotate the inner rotor portion 200E that is fixedly attached to the IOL with respect to the outer stator portion 100E that is fixedly positioned inside the lens capsule of the eye by help of two haptics (not shown) being attachable to two corresponding attachment portions 102E forming integral parts of the stator portion 100E.

FIG. 6B shows exploded view of the device 10E and illustrates the stator portion 100E, the rotor portion 200E, a back cover 400E, the movement system 300E including five interaction regions 328A-328E that are associated respectively with the five actuators 318A-318E.

As shown in FIG. 6B, the interactions regions 328A-328E form integral parts of the stator portion 100E and each is formed as a depression configured for receiving therein a portion of the actuators 318A-318E respectively.

The actuators, in this non-limiting example, include only activable portions without elastic portions. The activable portions of the actuators are separate elements fixedly received within suitable pockets in the rotor portion 200E so that they rotate together around the optical axis OA of the lens.

Each actuator is aligned differently with respect to the associated (respective) interaction region. Each actuator has a base and an arm extending upwardly from the base along a predetermined inclination angle. For simplicity, this is exemplified with the actuator 318A and it is equivalently applicable to the rest of actuators. As shown, the actuator has a base 318AB that is fixedly connected to the rotor portion 200E, and an arm 318AA extending from the base such that the upper portion of the arm is received within the depression 328A. the base and the arm have an angle α therebetween. Each actuator has a different angle α between its base and arm. In the non-limiting described example, actuator 318A has an angle α=90°, actuator 318B has an angle α=90°−β, actuator 318C has an angle α=90°−2β, actuator 318D has an angle α=90°+β and actuator 318E has an angle α=90°+2β.

When activated, every actuator is configured to take a shape saved in its memory, e.g. a shape in which α=90° and as a result of engagement with the associated depression, an incremental rotation movement will occur between the rotor portion and the stator portion. In this case, for example, activating actuator 318A will not cause the actuator 318A to alter its shape and no movement will occur. Further, as no elastic portion is present, the actuators will stay in the right angle shape (α=90°) after they cool down. This means that each actuator, in this example, can be activated only once.

Figure 6C:
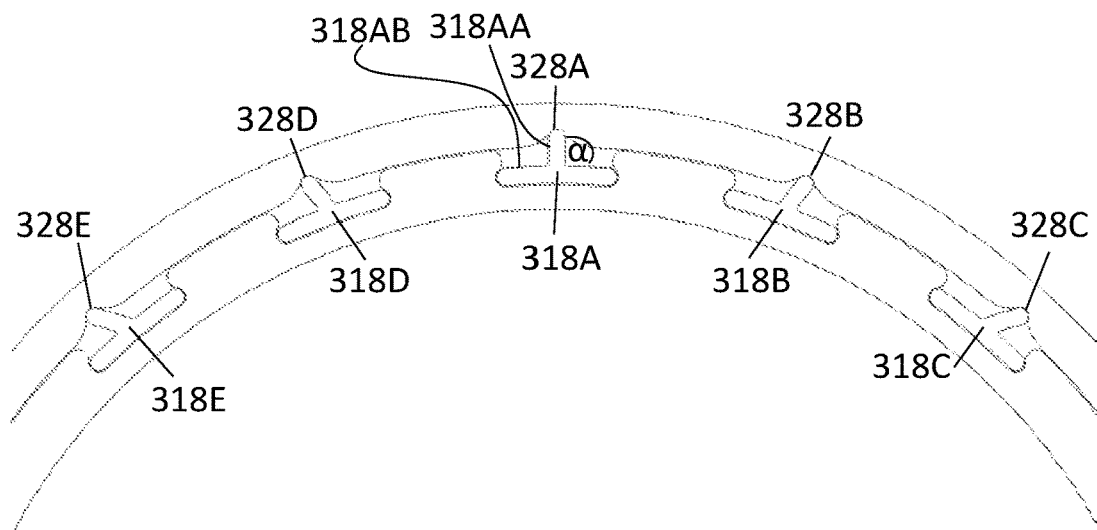
Figure 6D:
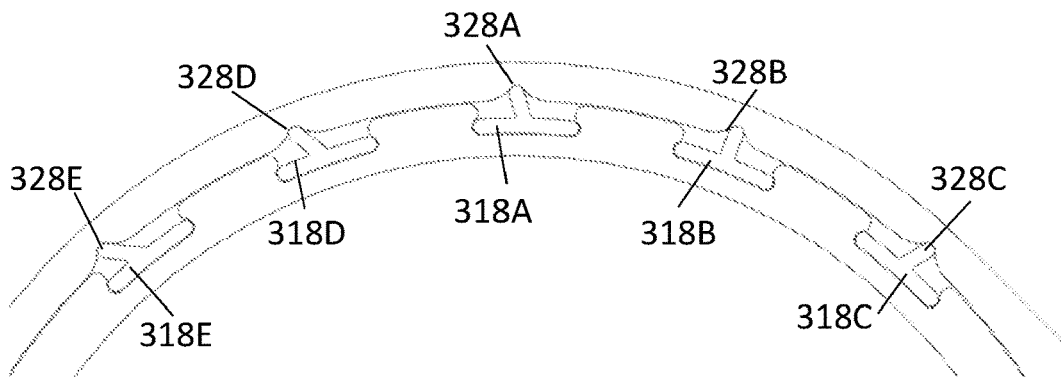
Figure 6E:
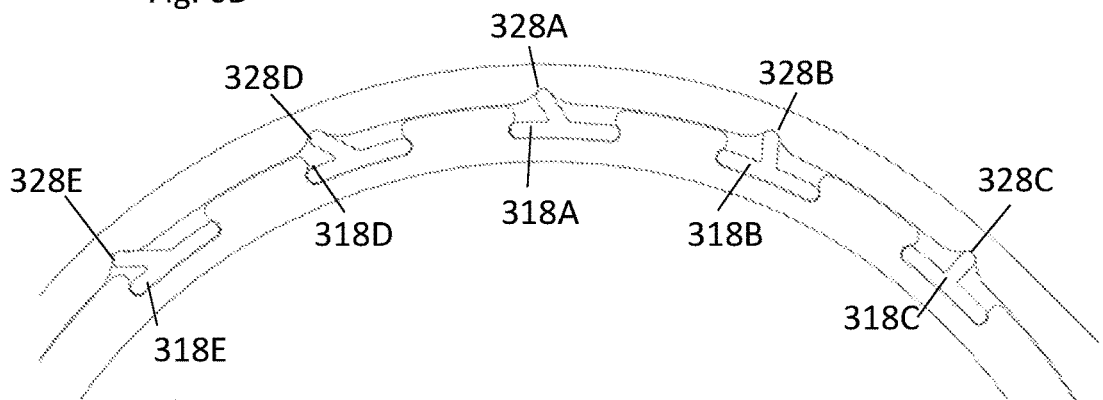
Figure 6F:
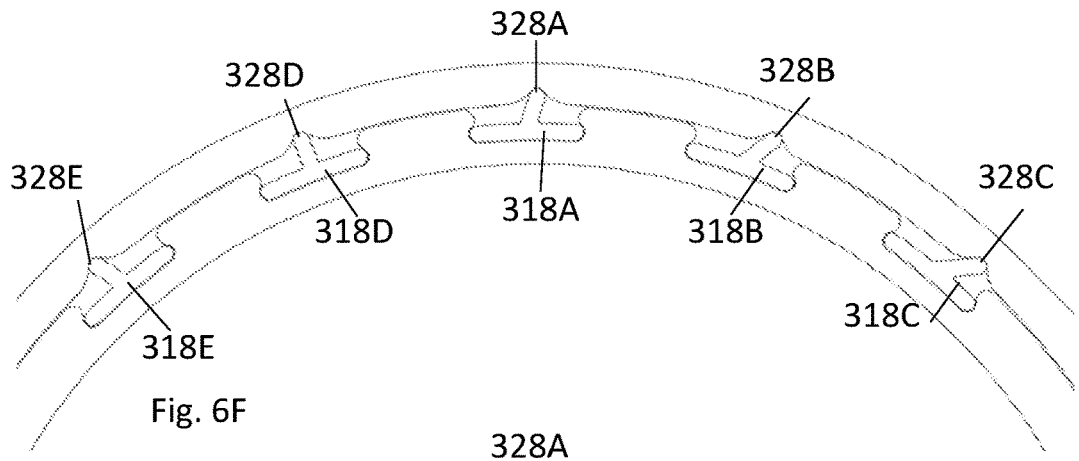
Figure 6G:
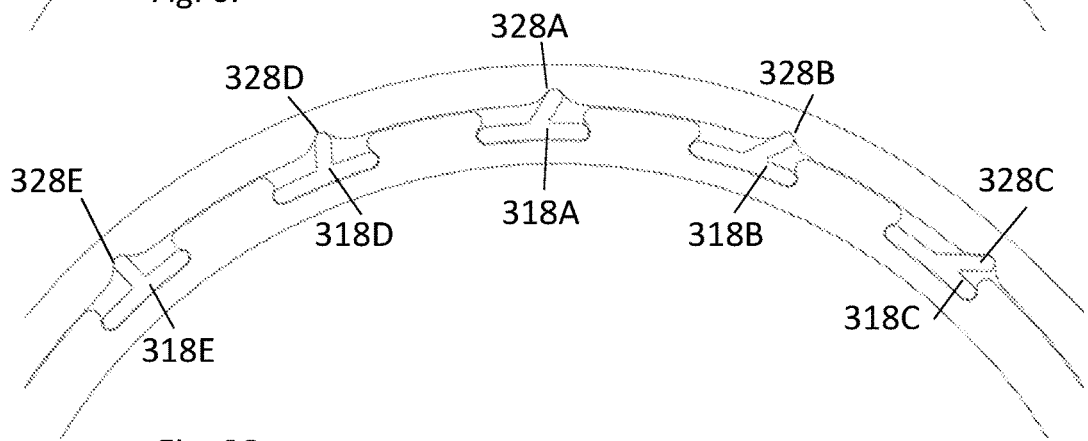

FIGS. 6D to 6G describe different displacements of the rotor portion with respect to the stator portion, as follows: FIG. 6D illustrates the new relative position between the rotor and stator portions after activating the actuator 318B, such that an incremental clockwise rotation of the rotor portion for angle β has occurred; FIG. 6E illustrates the new relative position between the rotor and stator portions after activating the actuator 318C, such that an incremental clockwise rotation of the rotor portion for angle 2β has occurred; FIG. 6F illustrates the new relative position between the rotor and stator portions after activating the actuator 318D, such that an incremental counterclockwise rotation of the rotor portion for angle β has occurred; FIG. 6G illustrates the new relative position between the rotor and stator portions after activating the actuator 318E, such that an incremental counterclockwise rotation of the rotor portion for angle 2β has occurred. It is appreciated that the described arrangement allows for either up to 2β clockwise rotation or up to 2β counterclockwise rotation. It is also appreciated, that the actuator 318A can be activated after each activation of another actuator in order to return the rotor portion to its first position as illustrated in FIG. 6C. increasing the number of actuators enables achieving wider range of incremental rotation distances (angles).

Figure 7A:
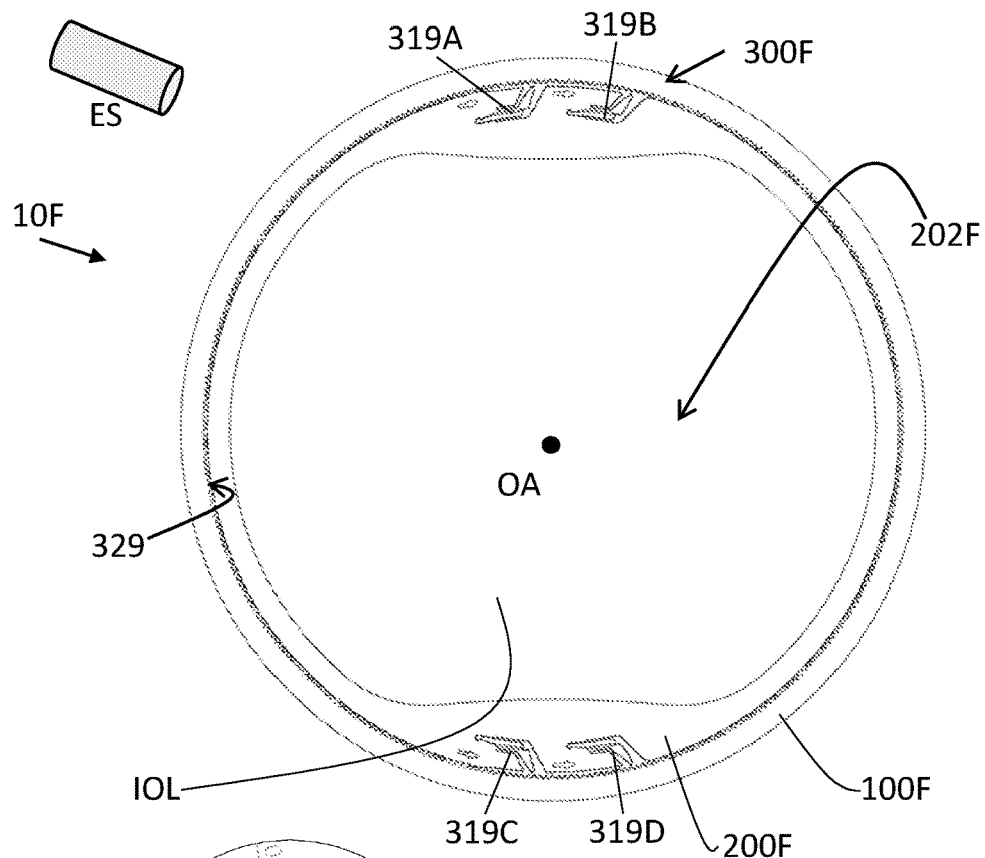
FIGS. 7A-7B illustrate a seventh non-limiting example of a device configured to hold an IOL and operable to remotely adjust position of the IOL after it has been implanted inside an eye, in accordance with the invention.
Figure 7B:
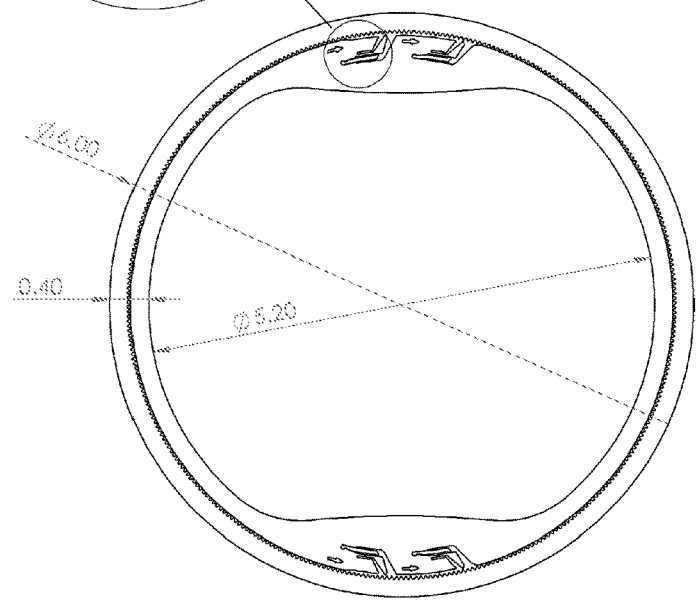

Reference is made to FIGS. 7A-7B illustrating another non-limiting example of a device 10F incorporating features of the present invention. FIG. 7A illustrates the rotor and stator portions as well as the movement system; and FIG. 7B is a close-up view on the movement system.

As shown in FIG. 7A, the device 10F includes a cavity 202F configured to receive the IOL, and is operable to rotate the IOL, around an optical axis OA of the IOL, by absorbing energy from the remote energy source ES (which is not part of the device 10F, as described above). The device 10F includes an outer stator portion 100F, an inner rotor portion 200F, and a movement system 300F operable, by the remote energy source ES, to rotate the inner rotor portion 200F that is fixedly attached to the IOL with respect to the outer stator portion 100F that is fixedly positioned inside the lens capsule of the eye by help of other components, such as two haptics, (not shown).

The movement system 300F includes a round/circular interaction region 329 that is associated with all actuators and forms an integral part of the stator portion 100F, at the inner side thereof, and is formed by a series of ridges/teeth protrusions spaced-apart by depressions/valleys as described above. Again, it can be the situation that the different actuators are aligned with corresponding different interaction regions. The movement system 300F also includes four actuators 319A-319D that are unidirectional actuators, similar in operation to the actuators of devices 10A and 10B, as will be further described below. Two nearby actuators, 319A and 319B, are responsible for clockwise rotation of the rotor and the IOL, and the other two nearby actuators, 319C and 319D, are responsible for counterclockwise rotation of the rotor and the IOL.

As clearly shown in FIG. 7B, in the movement system, in this non-limiting example, the actuator 319A (and similarly the rest of actuators) includes an activable portion 319AC and an elastic portion EM1F operable as described above. In this non-limiting example, both the activable portions and the elastic portions of the actuators are separate elements fixedly connected to the rotor portion so that they rotate together around the optical axis OA of the lens.

In this non-limiting example, as illustrated in FIG. 7B, the elastic portion EM1F of the actuator 319A is the actuator's part that engages with the interaction region 329 to cause the rotational movement of the rotor portion and the IOL. Close-up view 7B1 shows the actuator in its deactivated state. Arrows AR1F and AR2F illustrate respectively the paths of movement of the activable portion 319AC and the elastic portion EM1F when the activable portion is activated by the remote energy source thereby pushing the elastic portion towards the interaction region 329 such that the elastic portion engages with a ridge/tooth of the interaction region that is aligned therewith and causes the rotor portion together with the IOL to rotate.

As mentioned above, each one of the actuators, in this non-limiting example, is unidirectional being capable, when engaging with the associated interaction region, to rotate the rotor portion and the IOL in one angular direction, either clockwise or counterclockwise. The reason is that the curved structure of the elastic portion of the actuator is such that when it is forced to move by the activated activable portion, it moves in a curved line towards the interaction region (as explained in FIG. 2D above but with regard to the activable portion of the actuator), and not along a straight linear line like the actuators included in the device 10, the curved path enables the elastic portion of the actuator to engage only with one side of the ridge/tooth.

In this non-limiting example of the device 10F, the movement system is an example of a miniature movement system that was achieved by the Applicant. As shown in the figure, the ridge/tooth height is 0.03 mm, the width of a central part of the activable portion is 0.04 mm and the thinnest part of the elastic portion is 0.02 mm. The device outer diameter is 6.00 mm and the inner diameter, that receives the lens, is 5.2 mm. This achieves a large optically free enabled area, by that the movement system occupies a very small area around the optically enabled free area. In fact, in this non-limiting example, the ratio between the undisturbed optical area (clear optical path) and the whole device area is about approximately 73-75%. In general, in this non-limiting example as well as in the other devices described above, the nominal depth of the stator and rotor portions is about 0.03-0.1 mm. (Herein throughout the application, the word "about" means the specified number and a range of +/−10% margins around the specified number. Any other number described herein should be understood as also including +/−10% margins, even if not clearly affixed by the word "about"). In some embodiments, the IOL holding device, and more specifically the compensating movement system (specifically the actuators) and/or the rotor portion of the device, is/are at least partially isolated from the eye interior by a protective shielding device or assembly that prevents interaction between the eye and the moving parts of the IOL holding device (the moving parts is herein used to indicate the movement system, specifically the actuators, and the rotor portion, and every moving part of the IOL holding device). Such interaction may interrupt with the functionality of the movement system and/or the rotor portion of the IOL holding device. Since a slit/wound is created in the eye wall (sclera tissue) during the insertion of the IOL holding device and the IOL into the anterior chamber of the eye, a body reaction for healing the wound is initiated. One of the substances is intraocular Fibrin, a fibrous substance which entrance into the movement system and/or the rotor portion leads to blockage of the moving parts. Additionally, PCO (posterior capsule opacification), often referred to as "secondary cataract," is the most common postoperative complication of cataract extraction. In PCO, the posterior capsule undergoes secondary opacification due to the migration, proliferation, and differentiation of lens epithelial cells (LECs).

Reference is made to FIGS. 8A1-8G2 illustrating non-limiting examples of shielding devices/assemblies for use with IOL holding devices, either the IOL holding devices of the present invention, or others.

A first example is shown in FIGS. 8A1-8A2 illustrating a protective shield assembly 600 used with the device 10B described above in FIGS. 3A-3D. FIG. 8A1 is an exploded view and FIG. 8A2 is an assembled side view. As shown, two haptics 102F are attached to the attachment portions of the device 10B to enable positioning and locking of the device 10B inside the eye lens capsule.

In some embodiments, the protective shield device/assembly includes one unibody configuration that encapsulates the IOL holding device. In some embodiments, the protective shield device/assembly includes two or more parts that are attached to different portions of the IOL holding device or to at least the moving parts of the movement system. In some embodiments, when two or more parts form the protective shield device/assembly, the two or more parts are combined together to form an integral, unibody shield. In some embodiments, the two or more parts are attached, directly or indirectly, to the stator portion of the IOL holding device on the front and optionally also on the back side(s) of the stator portion. Attachment to the side(s) of the stator portion can be obtained by gluing, welding or other suitable means.

In the described example, the protective shield assembly 600 includes a front, anterior, part 602A, and a back, posterior, part 602B which are attached respectively to the front and back sides of the stator portion of the device 10B. By this, the whole movement system is enveloped and protected.

The protective shield devices/assemblies described herein are configured with transparent optical windows to allow for light to pass through the IOL from outside the eye towards the retina. In some embodiments, the front (inlet) and/or back (outlet) sides of the protective shield devices/assemblies are configured to allow passage of the light without interruption/interference. In some embodiments, the front (inlet) and/or back (outlet) sides of the protective shield devices/assemblies are configured to interfere with the incoming and outgoing light to enhance functionality of the IOL. In some embodiments, the protective shield devices/assemblies include one or more optical surfaces.

In this example, parts 602A and 6020B are made from transparent material forming transparent optical windows that allow the light to pass through the IOL towards the retina. Part 602A has a curved surface 602AS and Part 602B has a curved surface 602BS.

The protective shield devices/assemblies described herein are also configured to allow uninterrupted passage of the energy from the energy source ES towards at least the actuators of the movement system to enable their/its activation.

The protective shield devices/assemblies described herein can be produced from different suitable, biocompatible, materials. In some embodiments, the protective shield devices/assemblies are made, totally or partially, from same materials used commonly to produce the intraocular lenses. In some embodiments, the protective shield devices/assemblies are made, totally or partially, from flexible and/or elastic materials that allow them to be folded for easy insertion into the eye, and unfolded back without distortion.

In some embodiments, the protective shield device/assembly includes polymethyl methacrylate (PMMA). In some embodiments, the protective shield device/assembly is all made from PMMA. In some embodiments, some or all of the protective shield device/assembly is made from hydrophobic PMMA. In some embodiments, some or all of the protective shield device/assembly is made from hydrophilic PMMA. In some embodiments, some or all of the protective shield device/assembly is made from silicon.

The protective shield devices/assemblies described herein can provide extra toughness and/or rigidity to the shield-device combo, enabling by this flexibility of design of the device. For example, this allows using thinner parts of the stator and/or rotor and/or movement system, which in turn facilitates insertion of the IOL holding device into the lens capsule.

Another non-limiting example of the protective shield device/assembly is shown in FIGS. 8B1-8B2. FIG. 8B1 is a perspective view of the assembled shield-device combo and FIG. 8B2 is an exploded view. In this example, the protective shield device 600B envelopes and encapsulates the device 10B with the IOL. The protective shield device 600B includes a front part 602BA and a back part 602BB that are attachable to each other by known means in the art, such as by clipping, male-female attachment and the like. As the device 10B is enclosed inside the protective shield device 600B, the haptics can be included in one or more parts of the protective shield device, such as in the front part 602BA in this non-limiting example.

In both non-limiting examples of FIGS. 8A1-8A2 and 8B1-8B2, the protective shield device/assembly also acts as a cover that limits/prevents displacement of the rotor/stator/movement system in the axial direction (the optical axis direction), similarly to the front and back covers described above, in FIG. 4B for example. This enables reduction of the functional parts involved with the IOL holding device.

Another non-limiting example of the protective shield device/assembly is shown in FIGS. 8C1-8C2. FIG. 8C1 is a perspective exploded view and FIG. 8C2 is a side view of the front and back parts of the protective shield device/assembly 600C. The protective shield device/assembly 600C includes a front part 600CA and a back part 600CB that are configured to be attached to the stator portion of the device 10B indirectly, as they are attached to a front cover 500H and back cover 400H that are respectively attached to the front and back sides of the stator portion to limit the IOL holding device displacement along the axial direction. All of the attachments described above are done by gluing, welding or the like. As shown in FIG. 8C2, the front and back parts 600CA and 600CB include flat outer surfaces 602CAS and 602CBS respectively, that minimize optical interference with the light passing through the IOL.

Referring to FIGS. 8D1 and 8D2, another non-limiting example of the protective shield device/assembly is shown. FIG. 8D1 is a perspective exploded view and FIG. 8D2 is a cross-section view of the protective shield device/assembly 600D with the IOL and the holding device enclosed therein. The protective shield device/assembly 600D includes a front (anterior) part 602DA, a back (posterior) part 602DB and a side part 602DC that are configured to be attached to each other and form an enclosure that encloses the IOL2 and the IOL holding device 101. The side part 602DC includes two haptics 602I facilitating the implantation inside the eye capsule. It is noted that in this example, or other examples herein, the side part can form an integral part of either the anterior or posterior parts/covers, or of both. This non-limiting example illustrates another possible way to limit the IOL holding device displacement along the axial direction. As shown, the IOL2 is grooved along its circumference with a groove IOLG. The rotor portion 200I of the device 101 is configured to be inserted/accommodated inside the groove IOLG, and a distal (inner side) portion of the stator portion 100I is also configured to be inserted inside the groove IOLG while a proximal (outer) side of the stator portion is fixedly attached to the side part 602DC of the protective assembly 600D. In this case, the movement system 300I is located also within the groove IOLG. The described configuration holds the IOL2 stable in the axial direction and prevents dislocation of the IOL2 along the axial direction while enabling stable rotation around the optical axial axis.

In some embodiments (and not only in this example), the protective shield assembly includes one or more holes/channels that enable passage/flow of certain fluids, such as aqueous humour between inside and outside of the enclosure of the protective shield, while preventing entrance of other constituents, such as Fibrin, into the inside of the protective shield, such that interaction with and damage to the moving parts are prevented. The holes/channels may also promote pressure stability, as they enable filling the internal volume with a physiological liquid prior to folding and implantation, the liquid facilitates the de-folding after implantation. In this non-limiting example, the front and back covers include such holes/channels 602DH1 and 602DH2 respectively.

Referring to FIGS. 8E1 and 8E2, another non-limiting example of a protective shield device/assembly is shown. FIG. 8D1 is an exploded view and FIG. 8D2 is a cross-section view of the protective shield device/assembly 600E. In this example, the protective shield device/assembly 600E includes a side part 602EC only, that includes two haptics 602J facilitating the implantation inside the eye capsule. This non-limiting example uses another possible way, similar to the example of FIGS. 8D1-8D2, to limit the IOL holding device displacement along the axial direction. As shown, the IOL3 is grooved along its circumference with a groove IOLJ. The rotor portion 200J of the device 10J is configured to be inserted inside the groove IOU, and a distal (inner side) portion of the stator portion 100J is also configured to be inserted inside the groove IOLG while a proximal (outer side) portion of the stator portion is received in a groove 604J formed in the inner side of the side part 602EC of the protective assembly 600E. In this case, the movement system 300J is located also within the groove IOLJ. The described configuration holds the IOL3 stable in the axial direction and prevents dislocation of the IOL3 along the axial direction while enabling stable rotation around the optical axial axis. As shown, the protective shield assembly in this example excludes the front and back covers described in the previous example. The movement system 300J is protected by being enclosed within the groove IOU, and additionally by keeping the circumferential edge of the IOL2 as close as possible, in a predefined proximity, to the inner side of the side part 602EC, as shown in the close-up view of FIG. 8E2. The predefined proximity is chosen such that it prevents penetration of Fibrin and other unwanted biological tissue into the moving parts while allowing the rotational motion with a minimal friction.

Another non-limiting example of a protective shield device/assembly is shown in FIGS. 8F1-8F3. FIG. 8F1 is an exploded view and FIGS. 8F2-8F3 are cross-section views of the protective shield device/assembly 600F, assembled with the IOL inside. In this example, the protective shield device/assembly 600F includes a front part 602FA and a back part 602FB that are configured to be attached to each other and enclose the IOL4 and the IOL holding device 10K thereinside. Two haptics 602K facilitating the implantation inside the eye capsule are attached to the front part 602FA. In this non-limiting example, the IOL4 is cut on one of its optical sides IOL4S1 to receive therein the rotor portion 200K of the holding device 10K. The movement system 300K is covered by the IOL4 on one side and is revealed on the other side. This configuration enables a bigger optical area of the IOL4 than the examples described in FIGS. 8D1-8E2, it is easier to manufacture and more preserves the optical properties of the IOL. Comparing FIG. 8F3 to 8F2, two ring shaped members 606ER1 and 606ER2 can be added to constrict the displacement of the moving parts and the IOL in the axial direction and to provide extra protection to the movement system, at least on the side opposite the lens. The two members are attached on both sides of the stator portion 100K and extend distally beyond the inner side of the stator portion such that the outer side of the rotor portion 200K that interfaces with the inner distal side of the stator is also located between the two members and by this the dislocation of the rotor portion in the axial direction, together with the IOL4 that is attached thereto, is prevented.

FIGS. 8G1-8G2 illustrate yet another example of a protective shield device/assembly 600G. FIG. 8G1 is an exploded view and FIG. 8G2 is a cross-section view of the protective shield device/assembly 600G. As in the example of FIGS. 8E1-8E2, in this example, the protective shield device/assembly 600G includes a side part 602GC only, that includes two haptics 602L facilitating the implantation inside the eye capsule. This non-limiting example uses another possible way, similar to the example of FIGS. 8E1-8E2, to limit the IOL holding device displacement along the axial direction while protecting the movement system 300L. As shown, the IOL5 is grooved along its circumference with a groove IOLL. The rotor portion 200L of the device IOL is configured to be partially inserted and fixed with its inner side inside the groove IOLL and to be partially inserted with its outer side inside the groove 604L of the side part 602GC for prevention of axial motion. The stator portion 100L is received within the groove 604L of the side part 602GC. The outer side of the IOL5 and the inner side of the side part 602GC are cut/chamfered in opposite matching ways such that the inner side of the side part 602GC is received inside the outer side of the IOL5, in a male-female configuration, creating a predefined overlap between the side part and the IOL. This overlap between the side part's inner side and the IOL's outer side shields the movement system 300L that is located safely inside the groove 604L while maintaining minimal friction that enables undisturbed rotation of the IOL. Here also, as in the example of FIGS. 8E1-8E2, the protective shield assembly excludes the front and back covers described in previous examples, since the movement system is totally protected within the groove from invasion of Fibrin and other unwanted tissue.

The described configuration holds the IOL5 stable in the axial direction and prevents dislocation of the IOL5 along the axial direction while enabling stable rotation around the optical axial axis. Accordingly, it is appreciated that the present invention provides a powerful technique for controllable and precise remote displacement of an IOL around its optical axis, after the IOL has been implanted, to adjust the IOL position and enable it to function properly.

The invention claimed is:

1. A device configured to be implanted in a lens capsule of a human eye and securely hold an intraocular lens (IOL) and operable to rotate the IOL, around an optical axis of the IOL, by absorbing energy from a remote energy source, the device comprising:
    an outer stator portion configured to be fixedly positioned inside the lens capsule;
    an inner rotor portion configured to be fixedly attached to the IOL; and
    a movement system operable to cause incremental rotation of the inner rotor portion and the IOL, around the optical axis of the IOL, with respect to the outer stator portion, the movement system comprising a plurality of actuators having a fixed spatial relationship with the inner rotor portion and at least one interaction region associated with the plurality of actuators and having a fixed spatial relationship with the outer stator portion, the plurality of actuators comprise at least two actuators operable to cause the rotation of the inner rotor portion and the IOL in each of the clockwise and counterclockwise angular directions, the plurality of actuators and the at least one interaction region being aligned such that at each given moment in time, each actuator of the plurality of actuators is aligned differently with respect to the interaction region associated therewith such that the actuator faces a different interaction point on the associated interaction region, and is configured, if being activated by said remote energy source, to engage with the associated interaction region at the respective interaction point such that the actuator rotates and causes the IOL to rotate with a respectively different incremental rotation characterized by either a different angular distance or a different angular direction based on the location of the respective interaction point.

2. The device according to claim 1, wherein said plurality of actuators and the associated at least one interaction region are aligned in one of the following configurations:
    a) such that at each given time after an actuator of the plurality of actuators is activated by said remote energy source to engage with the associated interaction region at the respective interaction point and cause the IOL to rotate with a specific incremental rotation having specific angular distance and direction, a subsequent actuator of the plurality of actuators becomes aligned with its associated interaction region and configured, when being activated by said remote energy source to engage with its associated interaction region, to cause the IOL to rotate with the same specific incremental rotation having the same specific angular distance and direction; or
    b) such that after an actuator is activated to engage with the associated interaction region and cause the IOL to rotate with a specific incremental rotation having specific angular distance and direction, the actuator becomes misaligned with respect to the associated interaction region such that an immediately subsequent activation of the same actuator, after it returned to a disengaged resting configuration, to move again into the activated configuration and engage with the associated interaction region results in zero incremental rotation of the IOL.

3. The device according to claim 1, wherein said plurality of actuators comprise one of the following:
    a) two actuators spaced-apart with a first distance therebetween in one plane, and said associated at least one interaction region comprise two respective interaction regions in the same plane and spaced apart with a second distance therebetween being different than said first distance;
    b) at least three actuators spaced-apart with a variable distance therebetween in one plane, and said associated at least one interaction region comprise at least three respective interaction regions in the same plane and spaced apart with a constant distance therebetween; or
    c) at least three actuators spaced-apart with a constant distance therebetween, and said associated at least one interaction region comprise at least three respective interaction regions in the same plane and spaced apart with a variable distance therebetween.

4. The device according to claim 3, wherein said variable distance is characterized by a fixed increasing pitch between each two adjacent actuators of the at least three actuators or each two adjacent interaction regions of the at least three respective interaction regions.

5. The device according to claim 1, wherein at least some actuators of said plurality of actuators have one of the following configurations:
    a) when being sequentially activated in a specific activation order, to sequentially engage with the associated interaction region, they cause the IOL to rotate in sequential incremental rotations having equal angular distances and same angular direction;
    b) they are unidirectional such that when being individually activated, to engage with the associated at least one interaction region, they cause the IOL to rotate in same angular direction;
    c) they are bidirectional such that when being individually activated to engage with the associated at least one interaction region, they cause the IOL to rotate either in clockwise or counterclockwise angular direction based on their temporary alignment with respect to the associated interaction region;
d) they comprise a first group of unidirectional actuators operable to cause the IOL to rotate in clockwise direction, when being sequentially activated to engage with the associated interaction region, and a second group of unidirectional actuators operable to cause the IOL to rotate in counterclockwise direction, when being sequentially activated to engage with the associated at least one interaction region; or
e) each having a length dimension defining the actuator as being unidirectional actuator or bidirectional actuator configured, when being activated by said remote energy source, to cause the IOL to rotate in respectively one or two angular directions.

6. The device according to claim 1, wherein each actuator of said plurality of actuators comprises an actuator activable portion being reversibly shiftable between a first resting spatial configuration, and a second activated spatial configuration when being activated by said remote energy source, thereby respectively enabling the actuator to engage with and disengage from the associated interaction region.

7. The device according to claim 6, wherein each actuator of said plurality of actuators comprises an actuator elastic portion in communication with said actuator activable portion, the actuator elastic portion being operable to return the actuator activable portion from said second activated spatial configuration into said first resting spatial configuration once the actuator activable portion is no more activated by said remote energy source.

8. The device according to claim 7, wherein said actuator elastic portion is operable to engage with the associated interaction region, when said actuator activable portion is activated by said remote energy source, to cause the IOL to rotate with the incremental rotation.

9. The device according to claim 6, wherein said actuator activable portion comprises a shape-memory material operable to provide said first resting spatial configuration and, when heated, said second activated spatial configuration.

10. The device according to claim 1, wherein said outer stator portion or inner rotor portion comprises super-elastic material.

11. The device according to claim 10, wherein said device is foldable such that it can be passed through a cross-section of about 2.54 mm² area or about 1.8 mm circular diameter.

12. The device according to claim 1, wherein one or more of said at least one interaction region is (are) defined by a series of teeth protrusions, wherein each tooth protrusion defines an incremental rotation of angular distance being equivalent to or greater than an angle of 0.6°.

13. The device according to claim 1, further comprising a protective shielding assembly configured to shield the movement system and/or the inner rotor portion, at least partially, so as to prevent interaction of some kind(s) of biological tissue with the movement system and/or the inner rotor portion in a way that blocks the incremental rotation of the IOL.

14. The device according to claim 13, wherein said protective shielding assembly comprises an anterior cover and a posterior cover configured to shield the movement system and/or the inner rotor portion from anterior and posterior sides of the device respectively, wherein the anterior and posterior covers have one of the following configurations:
a) the anterior and posterior covers respectively shield the whole anterior and posterior sides of the device;
b) the anterior and posterior covers are configured to be attached, directly or indirectly, to the outer stator portion of the device;
c) the anterior and posterior covers are configured to be attached to the outer stator portion of the device by gluing and/or welding;
d) the anterior and posterior covers are attachable to each other such that they form an enclosure that envelopes the outer stator portion of the device.

15. The device according to claim 13, wherein said protective shielding assembly has one of the following configurations:
a) said protective shielding is configured to enable light entering the eye to pass through the IOL and reach the retina;
b) said protective shielding is configured to enable said energy from the remote energy source to reach the actuators;
c) said protective shielding is at least partially made from polymethyl methacrylate (PMMA);
d) said protective shielding is at least partially hydrophobic;
e) said protective shielding is at least partially hydrophilic;
f) said protective shielding comprises one or more channels that enable flow of aqueous humour between inside and outside of the protective shielding assembly while preventing said interaction of the some kinds of the biological tissue with the movement system and/or the inner rotor portion; or
g) said protective shielding comprises a side portion configured to attach to an outer side of the outer stator portion.

16. The device according to claim 13, wherein said protective shielding assembly comprises a side portion configured to attach to an outer side of the outer stator portion, wherein said side portion comprises a circumferential groove configured to fixedly accommodate at least an outer portion of the outer stator portion.

17. The device according to claim 16, wherein said groove is configured to accommodate all of the outer stator portion therein and, in addition, the movement system and at least an outer side of the inner rotor portion.

18. An IOL system comprising:
the device according to claim 16; and
an IOL, the IOL being grooved along its circumference and configured to accommodate at least an inner portion of the inner rotor portion therein.

19. The IOL system according to claim 18, wherein an inner side of said side portion is configured to engage with an outer circumferential side of said IOL in a male-female configuration respectively, thereby shielding the movement system and the inner rotor portion accommodated within the grooves while enabling the rotational movement of the IOL.

20. An IOL adjustment system comprising:
the device of claim 1; and
a remote energy source configured and operable to provide said energy in the form of heat to said plurality of actuators, the remote energy source comprising one of the following:
a radiating element;
a laser source;
a laser source configured and operable to provide continuous laser radiation;
an Argon laser source operable to provide light of a green spectrum;
a laser source comprising one or more laser diodes;

a laser source configured and operable to provide laser power between 0.1-5 watt, and laser pulse width between 200-1000 ms; or an electromagnetic radiation transmitter.

* * * * *